US011341231B2

(12) United States Patent
Yarabolu

(10) Patent No.: US 11,341,231 B2
(45) Date of Patent: May 24, 2022

(54) DATA SECURITY SYSTEM FOR ANALYZING HISTORICAL AUTHENTICATION ENTRY ATTEMPTS TO IDENTIFY MISAPPROPRIATION OF SECURITY CREDENTIAL AND ENFORCE PASSWORD CHANGE

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 219 days.

(21) Appl. No.: 16/903,536

(22) Filed: Jun. 17, 2020

(65) Prior Publication Data

US 2021/0397696 A1    Dec. 23, 2021

(51) Int. Cl.
*G06F 21/45* (2013.01)
*G06F 21/55* (2013.01)
*G06F 21/54* (2013.01)
*G06F 21/33* (2013.01)

(52) U.S. Cl.
CPC .............. *G06F 21/45* (2013.01); *G06F 21/33* (2013.01); *G06F 21/54* (2013.01); *G06F 21/554* (2013.01)

(58) Field of Classification Search
CPC ......... G06F 21/45; G06F 21/31; G06F 21/316
See application file for complete search history.

(56) References Cited

U.S. PATENT DOCUMENTS

| 2005/0235148 | A1* | 10/2005 | Scheldt .............. G06Q 20/3829 713/168 |
| 2011/0185401 | A1* | 7/2011 | Bak ...................... G06F 16/9024 726/5 |
| 2013/0254875 | A1* | 9/2013 | Sama ...................... G06F 21/31 726/19 |
| 2016/0307201 | A1 | 10/2016 | Turgeman et al. |
| 2019/0259030 | A1 | 8/2019 | Burger |
| 2021/0397696 | A1* | 12/2021 | Yarabolu ............... G06F 21/552 |

* cited by examiner

*Primary Examiner* — Ponnoreay Pich
(74) *Attorney, Agent, or Firm* — Moore & Van Allen PLLC; Nicholas C. Russell

(57) ABSTRACT

Embodiments of the invention are directed to a system, method, or computer program product structured for identifying potential misappropriation attempts into a technology resource and enforcing a credential lockout. In some embodiments, a system is structured for receiving a user credential associated with a first log-on attempt to access a technology resource, determining whether the user credential matches a stored valid credential, and, if it does not match, performing a misappropriation assessment. The misappropriation assessment includes evaluating and weighting a plurality of potential misappropriation factors, determining a misappropriation score from the weighted plurality of potential misappropriation factors, and adding the misappropriation score to a cumulative misappropriation score for the technology resource. The system is also structured for determining whether the cumulative misappropriation score has reached or exceeded a threshold and, if it has, enforcing a credential lockout for the technology resource.

20 Claims, 7 Drawing Sheets

500

Actual Password: STATE1
Max Attempts Allowed: 6
502

| | Session | Attempt | Password | Behavior Match Score | Trusted Device? | Auth. Code Triggered? | Auth. Code Verified? | Misapp. Score | Cum. Misapp. Score |
|---|---|---|---|---|---|---|---|---|---|
| 504 | ABC | 1 | STATE2 | 5% | No | No | N/A | 6 (Medium) | 6 |
| 506 | ABC | 2 | STATE1A | 6% | No | No | N/A | 4 (Medium) | 10 |
| 508 | ABC | 3 | UNIVERSITY1 | 3% | No | No | N/A | 9 (High) | 19 |
| 510 | ABC | 4 | CITY1 | 8% | No | No | N/A | 7 (High) | 26 |
| 512 | ABC | 5 | UNIVERSITY2 | 8% | No | No | N/A | 11 (High) | 37 |
| 514 | DEF | 1 | STATE1B | 52% | Yes | No | N/A | 1 (Low) | 38 |
| 516 | DEF | 2 | STATE1C | 86% | Yes | No | N/A | 0 (Low) | 38 |
| 518 | DEF | 3 | STATE1D | 90% | Yes | No | N/A | 0 (Low) | 38 |
| 520 | DEF | 4 | STATE1E | 86% | Yes | No | N/A | 0 (Low) | 38 |
| 522 | DEF | 5 | STATE1F | 86% | Yes | No | N/A | 0 (Low) | 38 |
| 524 | DEF | 6 | STATE1G | 86% | Yes | Yes | Yes | 0 (Low) | 38 |

Figure 5A

DATA SECURITY SYSTEM FOR ANALYZING HISTORICAL AUTHENTICATION ENTRY ATTEMPTS TO IDENTIFY MISAPPROPRIATION OF SECURITY CREDENTIAL AND ENFORCE PASSWORD CHANGE

BACKGROUND

An entity may store sensitive or secure information relating to a user. Accordingly, for a user to view a portion of the sensitive or secure information, the entity may need to authenticate the user. The authentication process may involve the user submitting a user credential, such as a password, to the entity that the entity verifies before granting the user access to view the portion of sensitive or secure information. However, in some cases, a third party unassociated with the user may attempt to misappropriate access to the sensitive or secure information by submitting what the third party predicts is the correct user credential to the entity. The entity may deny the third party access to the sensitive or secure information if the predicted credential is incorrect. Still, there is a need for a system that can identify when a received credential that is incorrect may be associated with a third party attempting to misappropriate access to the sensitive or secure information.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for generation and validation of secure authentication codes. In some instances, the system comprises: a memory device with computer-readable program code stored thereon; a communication device; and a processing device operatively coupled to the memory device and communication device, wherein the processing device is configured to execute the computer-readable program code to: receive a first user credential from a first user device, wherein the first user credential is associated with a first log-on attempt to access a technology resource; determine whether the first user credential matches a stored valid credential for the technology resource; in response to determining that the first user credential does not match the stored valid credential, perform a misappropriation assessment, wherein the misappropriation assessment comprises: evaluating a plurality of potential misappropriation factors for the first log-on attempt; weighting the plurality of potential misappropriation factors; determining a misappropriation score from the weighted plurality of potential misappropriation factors; and adding the misappropriation score to a cumulative misappropriation score for the technology resource, wherein the cumulative misappropriation score comprises at least one previous misappropriation score associated with a previous user credential and a previous log-on attempt; determine whether the cumulative misappropriation score has reached or exceeded a threshold; and in response to the cumulative misappropriation score reaching or exceeding the threshold, enforce a credential lockout for the technology resource.

In some embodiments, or in combination with any of the previous embodiments, the invention is further configured to: before performing the misappropriation assessment, determine whether a maximum number of log-on attempts has been reached within a session, the session comprising a period of time in which at least one user credential, including the first user credential, has been received, wherein each user credential is associated with a log-on attempt; and perform the misappropriation assessment further in response to determining that the maximum number of log-on attempts has not been reached.

In some embodiments, or in combination with any of the previous embodiments, evaluating the plurality of potential misappropriation factors comprises at least one of: determining a session for the first user credential, the session comprising a period of time in which at least one user credential, including the first user credential, has been received; determining a log-on attempt number for the first user credential, wherein the log-on attempt number represents a number of consecutive log-on attempts for the technology resource; determining a closeness of the first user credential to the stored valid credential; determining a behavior match score for the first log-on attempt; determining whether the first user device is a trusted user device; or determining whether an authentication code was sent to a user device associated with an authorized user of the technology resource based on the first log-on attempt and, in response to determining that the authentication code was sent, determining whether the authentication code was received back from the authorized user and verified.

In some embodiments, or in combination with any of the previous embodiments, evaluating the plurality of potential misappropriation factors comprises determining the closeness of the first user credential to the stored valid credential. Further, determining the closeness of the first user credential to the stored valid credential comprises: determining which characters in the first user credential match characters in the stored valid credential; and determining positions for the matching characters within the first user credential compared to positions for the matching characters within the stored valid credential.

In some embodiments, or in combination with any of the previous embodiments, evaluating the plurality of potential misappropriation factors comprises determining the behavior match score of the first log-on attempt. Further, determining the behavior match score comprises at least one of: determining a type of the first user device and whether the type of the first user device matches a type of device used to transmit a previous user credential that matched the stored valid credential; determining a similarity of a typing speed used to input the first user credential into the first user device and whether the typing speed used to input the first user credential matches a typing speed of an authorized user of the technology resource; or determining a similarity of the first user credential to a previous stored valid credential used for the technology resource.

In some embodiments, or in combination with any of the previous embodiments, enforcing the credential lockout comprises sending a notification to an authorized user of the technology resource, the notification indicating that the authorized user must reset the stored valid credential for the technology resource before additional log-on attempts to access the technology resource can be made.

In some embodiments, or in combination with any of the previous embodiments, the invention is further configured to: after enforcing the credential lockout for the technology resource, receive a new potential valid credential; evaluate whether the new potential valid credential satisfies a plurality of generic credential complexity rules for setting a new stored valid credential; evaluate whether the new potential valid credential satisfies a plurality of user-specific credential complexity rules for setting a new stored valid credential; and in response to determining that the new potential valid credential satisfies the plurality of generic credential complexity rules and the plurality of user-specific credential complexity rules, reset the new potential valid credential as the new stored valid credential for the technology resource.

In some embodiments, or in combination with any of the previous embodiments, the invention is further configured to: receive proof of an identity of an individual submitting the new potential valid credential; verify that the proof supports a conclusion that the individual is the authorized user of the technology resource; and set the new potential valid credential as the stored valid credential for the technology resource further in response to verifying that the proof supports the conclusion that the individual is the authorized user.

In some embodiments, or in combination with any of the previous embodiments, the plurality of generic credential complexity rules comprises at least one of: requiring the new stored valid credential to comprise a certain number of character types; requiring the new stored valid credential to be of at least a certain length; requiring the new stored valid credential to be different from a previous stored valid credential for the technology resource; or requiring the new stored valid credential to not include a commonly used credential.

In some embodiments, or in combination with any of the previous embodiments, the plurality of user-specific credential complexity rules are based on an analysis of a plurality of previous user credentials, the analysis identifying one or more patterns in the plurality of user credentials, wherein each previous user credential is associated with an unsuccessful log-on attempt to access the technology resource.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
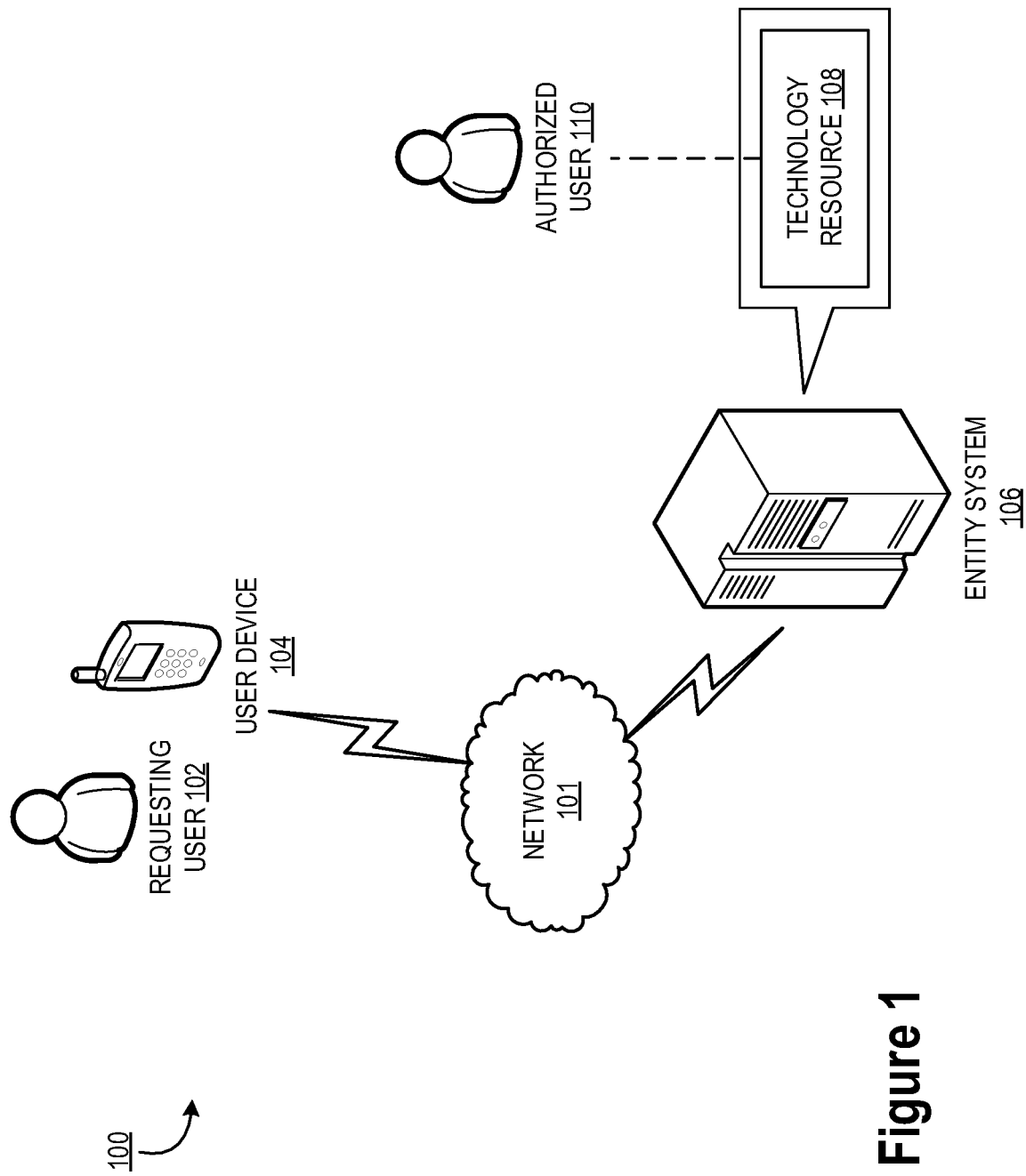
Figure 2:
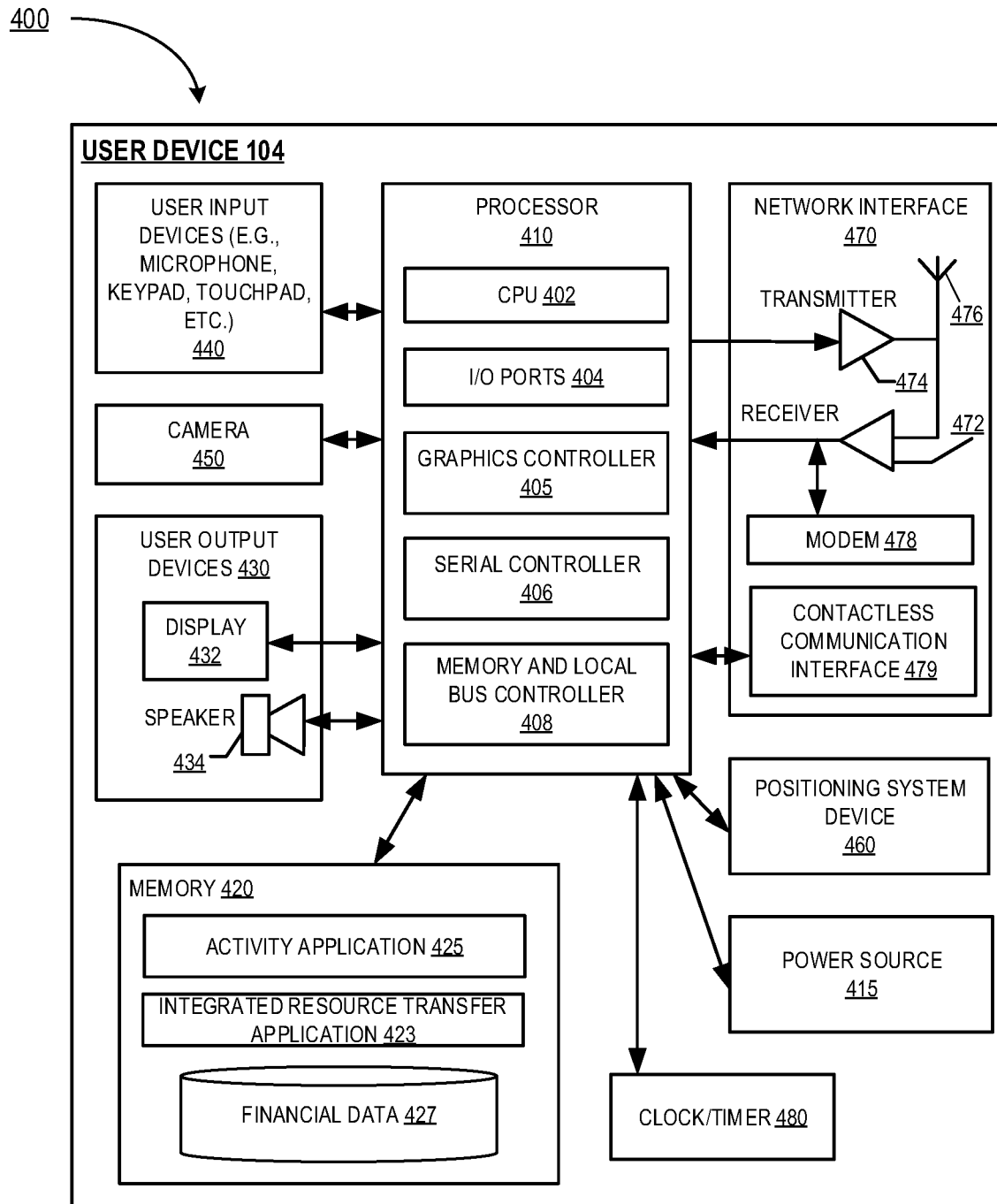
Figure 3:
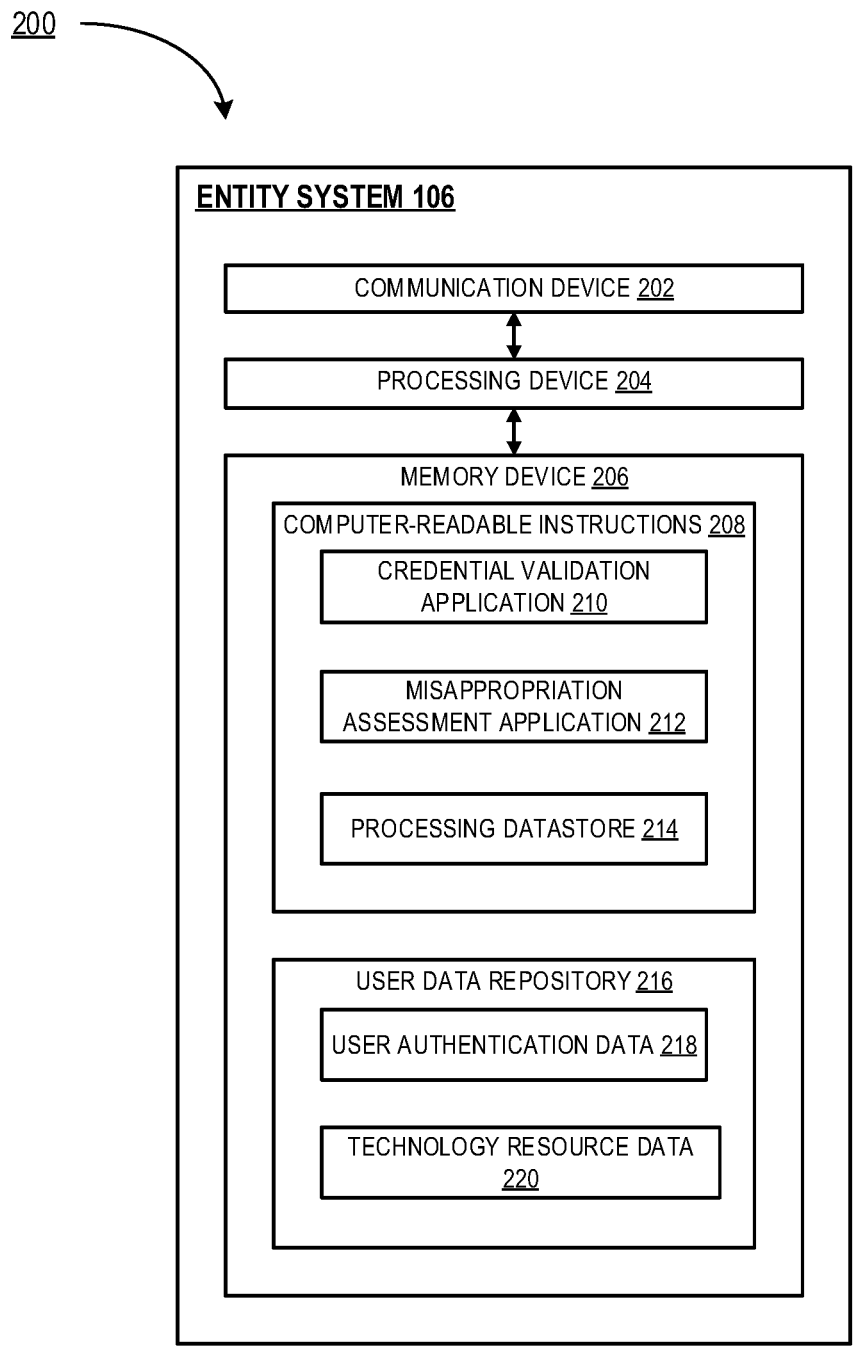
Figure 4:
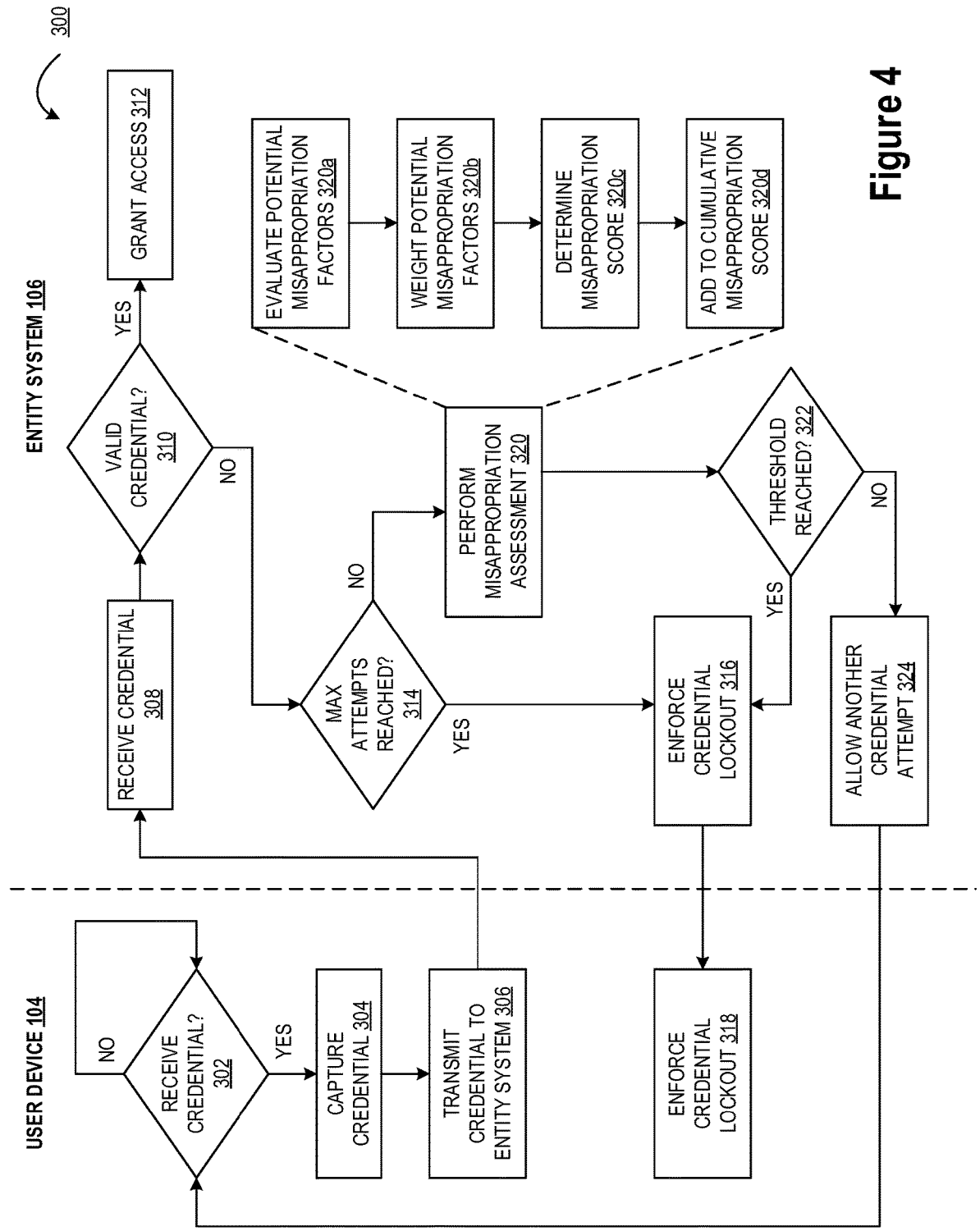
Figure 5B:
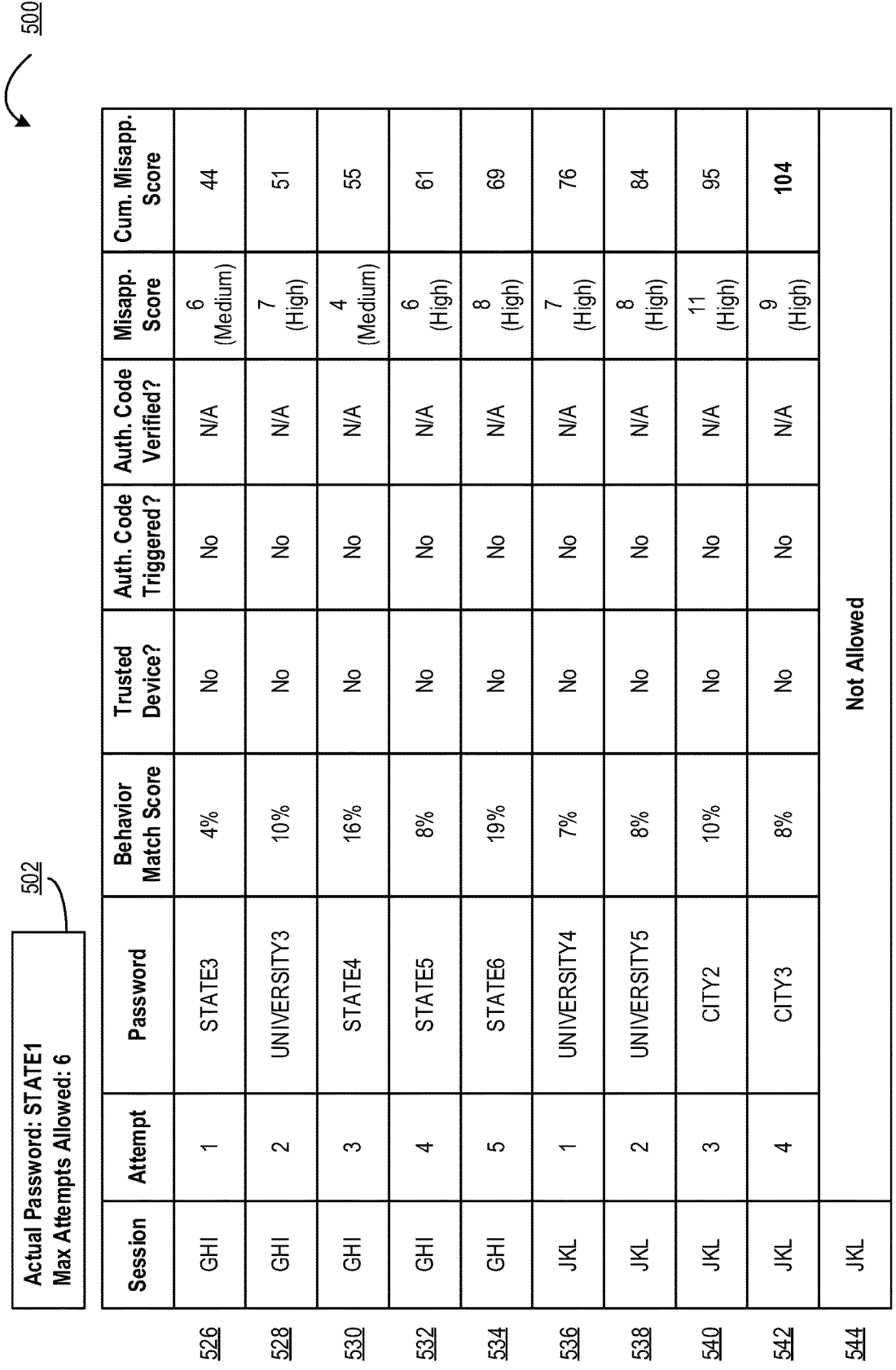
Figure 6:
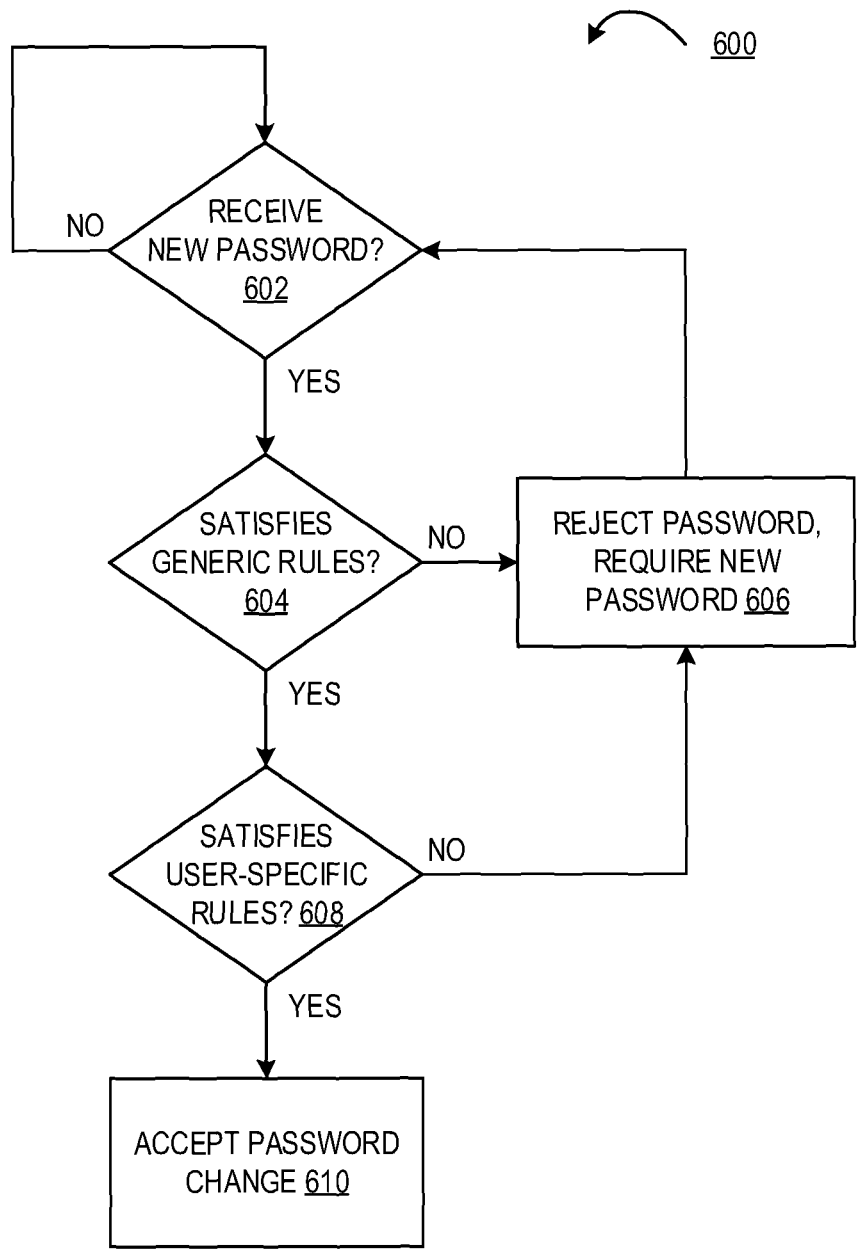

Having thus described embodiments of the invention in general terms, reference will now be made to the accompanying drawings, where:

FIG. 1 illustrates a block network architecture diagram illustrating a system environment 100 configured for analyzing historical authentication entry attempts to identify misappropriation of a security credential and enforce a change of the security credential, in accordance with some embodiments of the invention;

FIG. 2 illustrates a block diagram 400 of a user device, in accordance with some embodiments of the invention;

FIG. 3 illustrates a block diagram 200 of an entity system, in accordance with some embodiments of the invention;

FIG. 4 illustrates a high-level process flow 300 for analyzing historical authentication entry attempts to identify misappropriation of a security credential and enforce a change of the security credential, in accordance with some embodiments of the invention;

FIGS. 5A and 5B illustrate an exemplary log 500 of historical authentication entry attempts and a cumulative misappropriation score, in accordance with some embodiments of the invention; and FIG. 6 illustrates a high-level process flow 600 for changing a valid credential for a technology resource, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution or establishment that requires an authentication process to view information, such as sensitive or secure information, stored with the institution or establishment. As such, the entity may be any institution, group, association, financial institution, merchant, establishment, company, union, authority, or the like.

As described herein, an "authorized user" is an individual associated with an entity. As such, in some embodiments, the authorized user may be an individual having past relationships, current relationships, or potential future relationships with an entity. In some instances, an "authorized user" is an individual who has a relationship with the entity, such as a customer or a prospective customer. For example, in the instances where the entity is a resource entity or a merchant, financial institution, or the like, an authorized user may be an individual or entity with one or more relationships, affiliations, or accounts with the entity (e.g., the merchant, the financial institution). In some instances, the authorized user is an individual who seeks to utilize, operate, or perform one or more activities associated with a user device based on successful validation of the authorized user's authentication credentials. In some embodiments, an "authorized user" may be an employee (e.g., a technology operator/technician, an associate, a project manager, an information technology (IT) specialist, a manager, an administrator, an internal operations analyst, or the like) of the entity or enterprises affiliated with the entity, capable of operating the systems described herein. In some instances, an authorized user may be any individual or entity who has a relationship with a customer of the entity or financial institution. For purposes of this invention, the term "authorized user" and "customer" may be used interchangeably.

As described herein, a "requesting user" is an individual or group submitting an authentication credential to the entity. A requesting user may be an authorized user associated with the entity, or the requesting user may be a third party who is attempting to misappropriate an authorized user's access with the entity. In some cases, a requesting user may be an individual who prepares and submits an authentication credential to the entity, such as an individual who types an authentication credential into an input field. In other cases, including where the requesting user is a third party attempting to misappropriate access, the requesting user may use a system that predicts an authentication credential for an authorized user, for example, based on information known about the authorized user or based on general misappropriation techniques, such as a dictionary attack tool.

A "technology resource" or "account" may be the relationship that the authorized user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account may be associated with and/or maintained by an entity, and may typically be associated with technology infrastructure such that the resource or account may be accessed, modified, or acted upon by the authorized user electronically, for example, using transaction terminals, user devices, merchant systems, and the like. In some embodiments, the entity may provide one or more technology instruments or financial instruments to the authorized user for executing resource transfer activities or financial transactions. In some embodiments, the technology instruments/financial instruments, like electronic tokens, credit cards, debit cards, checks, loyalty cards, entity user device applications, account identifiers, routing numbers, passcodes and the like, may be associated with one or more resources or accounts of the authorized user. As discussed, in some embodiments, the entity may represent a vendor or a merchant with whom the user engages in financial transactions (e.g., resource transfers like purchases, payments, returns, enrolling in merchant accounts and the like) or non-financial transactions (for resource transfers associated with loyalty programs and the like), either online or in physical stores or merchant locations. Alternatively, in some embodiments, a "technology resource" or "account" may be related to the authorized user's employment with the entity. For example, a technology resource may be an employment account that the authorized user can access in order to perform duties in association with the authorized user's employment.

As used herein, a "user interface" may be a graphical user interface (GUI) that facilitates communication using one or more communication mediums, such as tactile communication (e.g., communication via a touchscreen, keyboard, and the like), audio communication, textual communication, and/or video communication (e.g., gestures detected by a camera). In various embodiments, a graphical user interface of the present invention may be a type of interface that allows users (e.g., authorized users or requesting users) to interact with electronic elements/devices, such as graphical widgets, graphical icons, and visual indicators (e.g., secondary notation), as opposed to using only text via the command line. That said, the graphical user interfaces may be configured for audio, visual, and/or textual communication, and may be configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface may be configured to be presented on one or more display devices associated with user devices, entity systems, auxiliary user devices, processing systems, and the like.

An electronic activity, also referred to as a "technology activity" or a "user activity," such as a "resource transfer" or "transaction," may refer to any activities or communications between a user (e.g., an authorized user or a requesting user) or entity and a financial institution, between the user and the entity, activities or communication between multiple entities, communication between technology applications, and the like. A resource transfer may refer to a payment, a processing of funds, a purchase of goods or services, a return of goods or services, a payment transaction, a credit transaction, or other interactions involving an authorized user's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on an authorized user's computer or mobile device, an authorized user accessing their e-wallet, applying one or more coupons to purchases, or any other interaction involving the authorized user and/or the authorized user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any user activity (financial or non-financial activity) initiated between an authorized user and a resource entity (such as a merchant), between the authorized user and a financial institution, or any combination thereof.

In accordance with embodiments of the invention, the term "electronic communication" may refer to a communication associated with a user (e.g., an authorized user or a requesting user), typically received, viewed, and/or transmitted via a communication channel. In some embodiments, electronic communications may be associated with user communications relating to user travel, user appointments, etc. (e.g., non-financial communications). In some embodiments, electronic communications may be associated with user communications relating to authorized user financial statements (e.g., savings statements, shareholder notices, etc.), bill payments, account notifications, communications requiring actions to be performed by the authorized user, communications triggering resource/account activities, documents to be signed by the authorized user, etc. (e.g., financial communications). In some embodiments, communication channels may comprise cellular, audio, email, cellular messaging, website, mobile application notifications, and the like.

Under current systems and methods, an entity may store sensitive or secure information relating to an authorized user. For example, the entity may store sensitive or secure information in connection with a technology resource that that the entity administers, where the technology resource is associated with the authorized user who can use and manage the technology resource. The sensitive or secure information stored by the entity may relate to the authorized user (e.g., the authorized user's birthday, address, and the like) or to the technology resource (e.g., an account name, an account balance, a resource transfer history, employment information, and the like). As such, before the authorized user can access the technology resource, the entity may require that the authorized user complete an authentication process. As part of the authentication process, the authorized user may be required to input a user credential (e.g., a username, a password, a biometric, and/or the like), such as via a log-in screen displayed to the authorized user on the authorized user's device. The entity uses the user credential to identify the technology resource associated with the authorized user (e.g., based on an input username) and the entity further verifies whether the user credential matches a stored, valid credential for the technology resource (e.g., based on an input password matching a stored password for the technology resource). If the entity can identify the technology resource and verify the user credential, the entity then grants the authorized user access to the technology resource. Otherwise, the entity denies the authorized user access to the technology resource.

However, in some cases, a third party who is not the authorized user may attempt to log in and access the authorized user's technology resource by submitting a user credential to the entity. If the user credential submitted by the third party does not match the stored, valid credential for the technology resource, the entity will deny the third party access to the technology resource. Still, it may be desirable for the entity to be able to determine the likelihood of an incorrect user credential being associated with a third party attempting to misappropriate access to the technology resource instead of being the result of the authorized user incorrectly inputting the user credential as part of a log-on attempt.

In some cases, an entity may use measures to prevent misappropriation of the technology resource and enforce, as an illustration, a password change for the technology resource. For example, a password lock counter for a technology resource may be increased by one after each incorrect password and failed log-on attempt during a session until the password lock counter reaches a maximum number for allowed log-in attempts. At this point, the password may be locked down. However, after a successful log in to the technology resource, the password lock counter may be reset to 0. Additionally, or alternatively, the password lock counter may be reset to 0 after a certain amount of time has passed since the last log-on attempt (e.g., once the log-on session has expired). This may leave a third party attempting to misappropriate access to the authorized user's technology resource an opportunity to make a certain number of log-in attempts after the third party is sure that the password lock counter has been reset to 0 (e.g., after a certain amount of time has passed or the authorized user has successfully logged into the technology resource), with the third party stopping their log-in attempts once the password lock counter is one unit under the maximum allowed log-in attempts. In this way, the third party may be able to keep attempting to misappropriate access by submitting user credentials without locking down the technology resource, which would alert the authorized user to the third party's misappropriation attempts.

Further, in some cases, an entity may require the authorized user to change the stored, valid credential for their technology resource after a particular amount of time has passed, such as six months from their last credential change. Yet this amount of time may be irrespective of whether a third party has been attempting to misappropriate access the technology resource. Thus, whether the authorized user is required to change their valid credential in the near future may not be connected to a log-on attempt pattern by the third party and the probability of the third party having success in cracking the authorized user's valid credential. Moreover, even when the authorized user changes their stored, valid credential, either voluntarily or based on an enforced credential change, the same rules for the new credential may be applied irrespective of the log-on attempt pattern. For example, if the valid credential includes a password, the same password complexity rules (e.g., that the password be of a certain length, that the password include a number and a special character, and so on) may be applied for every customer regardless of the log-on attempt history for the associated technology resource.

By accounting for historical authentication entry attempts to access the technology resources, the entity may be able to better protect the security of the technology resources that it administers. Accordingly, embodiments of the present disclosure are directed to systems and methods for analyzing historical authentication entry attempts and using the analyzed information to enforce a change of a stored, valid credential. More specifically, in various embodiments described herein, when the entity receives a user credential from a requesting user as part of a log-on attempt, the entity may try to identify the technology resource from the user credential and validate the user credential for that technology resource. If the entity identifies the technology resource but cannot validate the user credential (e.g., the user credential includes an email or other username matching a technology resource but has the wrong password for the technology resource), the entity may deny the requesting user access to the technology resource such that the log-on attempt is unsuccessful. However, the entity may further perform a misappropriation assessment to determine a likelihood that the log-on attempt was an attempt to misappropriate access to the technology resource. The misappropriation assessment may include evaluating a number of factors that, depending on their outcome, weigh in favor or against the log-on attempt being an attempt to misappropriate access to the technology resource, and then weighting those factors to produce a misappropriation score for the log-on attempt.

The entity may add the misappropriation score to a cumulative misappropriation score for the technology resource, where the cumulative misappropriation score includes misappropriation scores for previous unsuccessful log-on attempts for the technology resource. In this way, the cumulative misappropriation score represents a measure of how likely it is that a third party has been attempting to misappropriate access to the technology resource. A low score may represent a low probability that a third party has been attempting to misappropriate access, while a high score may represent a high probability that a third party has been attempting to misappropriate access. Accordingly, the entity may further set a threshold for the cumulative misappropriation score and enforce a lockout of the technology resource once the cumulative misappropriation score reaches or crosses that threshold. For example, the entity may require the authorized user to change the password for the technology resource before the entity will attempt to validate any further user credentials received for the technology resource.

Additionally, when the authorized user changes the password for the technology resource, the entity may enforce rules on the new password that are derived from the historical authentication entry attempts for the technology resource. To illustrate, the entity may identify patterns in the user credentials used in the unsuccessful log-in attempts and create rules for the new password that will cause the new password to deviate from those patterns. As an example, the entity may determine that the historical attempts to log onto the technology resource include a large number of user credentials that appear to be based on the names of large cities. As such, the entity may enforce a rule that the new password cannot include or be similar to the name of a large city.

By doing the above, the entity is accounting for a history of misappropriation attempts on the technology resource when determining when to lock out the technology resource. This in turn may help the entity enforce a change of the stored, valid credential for the technology resource before the third party attempting to misappropriate access to the technology resource finally inputs the correct user credential and successfully logs onto the technology resource. Further, by enforcing rules on the credential change that are specific to the log-on attempt history for the technology resource, the entity may help ensure that any further misappropriation attempts made on the technology resource are unsuccessful even after the stored, valid credential has been changed.

Referring to FIG. 1, a block diagram illustrating a system environment 100 configured for analyzing historical authentication entry attempts to identify misappropriation of a security credential and enforce a change of the security credential (e.g., a password change) is illustrated, in accordance with some embodiments of the invention. As illustrated, the system environment 100 includes an entity system 106 that is in operative communication with a user device 104, where the user device 104 is associated with a requesting user 102. As such, the user device 104 is configured to receive data from and transmit data to the entity system 106, and, in turn, the entity system 106 is configured to receive data from and transmit data to the user device 104. The entity system 106 also administers a technology resource 108 that is associated with an authorized user 110. For example, the authorized user 110 may store an amount of resources in the technology resource 108. The authorized user 110 may or may not be the same as the requesting user 102 in various embodiments, as described in further detail below Typically, the user device 104 is in electronic communication with the entity system 106 via the network 101, which may be the internet, an intranet, or the like. The network 101 is configured to establish an operative connection between otherwise incompatible devices, for example, by establishing a communication channel, automatically and in real time, between the user device 104 and the entity system 106. In this regard, the wireless communication channel may further comprise near field communication (NFC), communication via radio waves, communication through the internet, communication via electromagnetic waves, and the like. In FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The user device 104 may comprise a mobile communication device, such as a cellular telecommunications device (e.g., a smartphone or mobile phone), a computing device such as a laptop computer or a desktop computer, a personal digital assistant (PDA), a mobile internet accessing device, or other mobile device including, but not limited to, pagers, mobile televisions, gaming devices, cameras, video recorders, audio/video players, radios, global positioning system (GPS) devices, any combination of the aforementioned, or the like. The user device 104 is configured to connect to the network 101, as well as receive and transmit information over the network 101. As an illustration, the user device 104 may transmit a user credential to the entity system 106 as part of a log-on attempt, made by the requesting user 102, to access the technology resource 108. The components of the user device 104, its features, and its functions will be described in further detail below and with respect to FIG. 2, in particular.

The entity system 106 is associated with the entity and configured to store information relating to the relationship the authorized user 110 has with the entity. For example, as illustrated in FIG. 1, the authorized user 110 may be associated with a technology resource 108 the authorized user 110 maintains with the entity, and the entity system 106 may accordingly store information about the authorized user 110 and information about the technology resource 108 (e.g., an amount of resources stored by the authorized user 110 in the technology resource 108). Additionally, the entity system 106 is configured to receive a log-on request from the requesting user 102 via the user device 104 for access to the technology resource 108, where the log-on request includes a user credential submitted by the requesting user 102. In response, the entity system 106 is further configured to attempt to authenticate the requesting user 102 using the received user credential and, if the entity system 106 cannot authenticate the user 102 with the user credential, perform a misappropriation analysis to identify whether the log-on attempt was potentially an effort to misappropriate the technology resource 108, as described further below. The components of the entity system 106, its features, and its functions will be described in further detail below and with respect to FIG. 3, in particular.

FIG. 2 illustrates a block diagram 400 of a user device 104, such as a smartphone, tablet computer, laptop computer, or desktop computer, in accordance with some embodiments of the invention. A user device 104 may generally include a processing device or processor 410 communicably coupled to devices of the user device 104, such as a memory device 420; user output devices 430 (e.g., a user display device 432 and/or a speaker 434); user input devices 440 (e.g., a microphone, keypad, touchpad, touch screen, and the like); a communication device or network interface device 470; a power source 415; a clock or other timer 480; a visual capture device, such as a camera 450; a positioning system device 460, such as a geo-positioning system device (e.g., a GPS device, an accelerometer, and the like); one or more chips; and the like. The processor 410 may further include a central processing unit (CPU) 402, input/output (I/O) port controllers 404, a graphics controller 405, a serial bus controller 406, and a memory and local bus controller 408.

The processor 410 may include functionality to operate one or more software programs or applications, which may be stored in the memory device 420. For example, the processor 410 may be capable of operating applications such as an activity application 425, an integrated resource transfer application 423, or a web browser application. The activity application 425, for example, may then allow the user device 104 to transmit and receive data and instructions from the entity system 106 (e.g., via wireless communication); web content, such as, for example, location-based content and/or other web page content, according to a Wireless Application Protocol (WAP), Hypertext Transfer Protocol (HTTP); and/or the like.

In various embodiments, the activity application 425 allows the user device 104 to transmit data to and receive data from the entity system 106. More specifically, the activity application 425 is configured to facilitate the requesting user 102 with performing a log-on attempt to access the technology resource 108 maintained by the entity system 106. In this way, the activity application 425 may be configured as a dedicated application associated with the entity system 106 operating on the user device 104, as a general application in electronic communication with the entity system 106 (e.g., a web browser application), or the like. Moreover, the activity application 425 is configured to allow the user device 104 to capture a user credential from the requesting user 102 (e.g., via the requesting user 102 inputting the user credential through a graphical user interface displayed on the user device 104) as part of a log-on attempt. The activity application 425 is also configured to transmit the user credential to the entity system 106. Depending on whether the requesting user 102 can be authenticated from the user credential, the activity application 425 is configured to receive an access token from the entity system 106 or receive an indication from the activity application 425 that the requesting user 102 cannot log in to access the technology resource 108.

The integrated resource transfer application 423 and the financial data module 427, together, may include the necessary circuitry to provide token storage and transmission functionality and transmitter device signal encoding and decoding functionality to the user device 104, for example, for secure transmission of financial and authentication credential tokens via the contactless communication interface 479 to the entity system 106. That said, in some embodiments, the integrated resource transfer application 423 may be pre-installed on the user device 104, while in other embodiments, the entity system 106 may transmit and cause installation of the application 423 based on determining that the user device 104 does not comprise the application 423. In some embodiments, the integrated resource transfer application 423 may, alternatively or additionally, be part of the activity application 425, or the activity application 425 may be part of the integrated resource transfer application 423.

The processor 410 may be configured to use the network interface 470 to communicate with one or more devices on the network 101, such as, but not limited to the entity system 106 (e.g., via the network 101). In this regard, the network interface device 470 may include an antenna 476 operatively coupled to a transmitter 474 and a receiver 472 (together a "transceiver"), a modem 478, and a contactless communication interface 479. The processor 410 may be configured to provide signals to and receive signals from the transmitter 474 and receiver 472, respectively. The signals may include signaling information in accordance with the air interface standard of the applicable Bluetooth® Low Energy (BLE) standard, cellular system of the wireless telephone network, and the like, that may be part of the network 101. In this regard, the user device 104 may be configured to operate with one or more air interface standards, communication protocols, modulation types, and access types.

By way of illustration, the user device 104 may be configured to operate in accordance with any of a number of first, second, third, fourth, and/or fifth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)); with third-generation (3G) wireless communication protocols, such as Universal Mobile Telecommunications System (UMTS), CDMA2000, wideband CDMA (WCDMA) and/or time division-synchronous CDMA (TD-SCDMA); with fourth-generation (4G) wireless communication protocols; with fifth-generation (5G) wireless communication protocols; and/or the like. The network interface 470 of the user device 104 may also be configured to operate in accordance with non-cellular communication mechanisms, such as via a wireless local area network (WLAN) or other communication/data networks.

The network interface device 470 or communication device 470 may also include a user interface presented by one or more user output devices 430 in order to allow a user 102 to execute some or all of processes described herein. The application interface may have access to the hardware (e.g., the transceiver) and software previously described with respect to the network interface device 470. Furthermore, the user interface may have the ability to connect to and communicate with an external data storage on a separate system within the network 101.

As described above, the user device 104 may include user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440 may include any of a number of devices allowing the user device 104 to receive data from a user 102, such as a keypad, keyboard, touchscreen, touchpad, microphone, mouse, joystick, other pointer device, button, soft key, and/or other input device(s).

The user device 104 may further include a power source 415. Generally, the power source 415 may be a device that supplies electrical energy to an electrical load. In some embodiments, the power source 415 may convert a form of energy such as solar energy, chemical energy, mechanical energy, and the like, to electrical energy. Additionally, the power source 415 in the user device 104 may be a battery, such as a lithium battery, a nickel-metal hydride battery, or the like, that is used for powering various circuits, for example, the transceiver circuit and other devices that are used to operate the user device 104. Alternatively, the power source 415 may be a power adapter that can connect a power supply from a power outlet to the user device 104. In such embodiments, a power adapter may be classified as a power source "in" the user device 104.

The user device 104 may also include a memory buffer, cache memory, or temporary memory device operatively coupled to the processor 410. Typically, one or more applications (e.g., applications 425 and 423) are loaded into the temporary memory during use. As used herein, memory may include any computer-readable medium configured to store data, code, or other information. For example, the memory may store computer-readable program code including one or more executable portions. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

FIG. 3 illustrates a block diagram 200 of the entity system 106, in accordance with some embodiments of the invention. As illustrated in FIG. 3, the entity system 106 may include a communication device 202; a processing device 204; and a memory device 206 having a credential validation application 210, a misappropriation assessment application 212, and a processing datastore 214. As shown, the processing device 204 is operatively connected to and configured to control and cause the communication device 202 and the memory device 206 to perform one or more functions. In some embodiments, the credential validation application 210 and/or misappropriation assessment application 212 comprises computer-readable instructions or computer-readable code that when executed by the processing device 204 cause the processing device 204 to perform one or more functions. For example, the credential validation application 210 and/or misappropriation assessment application 212 may include a computer-readable code having one or more executable portions. It will be understood that the credential validation application 210 and/or misappropriation assessment application 212 may be executable to initiate, perform, complete, and/or facilitate one or more portions of any embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the user device 104. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

Additionally, referring to the entity system 106 illustrated in FIG. 2, the processing device 204 may generally refer to a device or combination of devices having circuitry used for implementing the communication and/or logic functions of the processing device 204. For example, the processing device 204 may include a control unit; a digital signal processor device; a microprocessor device; and various analog-to-digital converters, digital-to-analog converters, and other support circuits and/or combinations of the foregoing. Control and signal processing of the entity system 106 may be allocated between these processing devices according to their respective capabilities. The processing device 204 may further include functionality to operate one or more software programs based on computer-readable instructions 208 thereof, which may be stored in the memory device 206, such as the credential validation application 210 and the misappropriation assessment application 212.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 204 may be configured to use the network communication interface of the communication device 202 to transmit and/or receive data and/or commands to and/or from the other devices/systems connected to the network 101.

The memory device 206 within the entity system 106 may generally refer to a device or combination of devices that store one or more forms of computer-readable media for storing data and/or computer-executable program code/instructions. For example, the memory device 206 may include any computer memory that provides an actual or virtual space to temporarily or permanently store data and/or commands provided to the processing device 204 when it carries out the functions described herein.

The entity system 106 may further include a user data repository 216 comprising user authentication data 218 and technology resource data 220. The processing device 204 may utilize the user authentication data 218 to validate user credentials, as described in further detail below. Additionally, the user authentication data 218 may include a cumulative misappropriation score determined for the technology resource 108, which is also described in further detail below, as well as cumulative misappropriation scores for other authorized users and their technology resources associated with the entity. The technology resource data 220 may reflect current data for the technology resource 108 associated with the authorized user 110, as well as technology resources associated with the same authorized user 110 and/or other authorized users of the entity. The current data for the technology resource 108 may include, for example, the name of the technology resource 108 (e.g., an account name), a balance held in the technology resource 108, and the like.

In some embodiments, the credential validation application 210 may comprise computer-readable instructions associated with one or more authentication steps, or the computer-readable instructions associated with one or more authentication steps may be stored in the processing datastore 214. The credential validation application 210 may be embodied within the misappropriation assessment application 212, in some instances, or the misappropriation assessment application 212 may be embodied in the credential validation application 210, in some instances. In some embodiments, the credential validation application 210 comprises computer-readable instructions that, when executed by the processing device 204, cause the processing device 204 to perform one or more functions and/or transmit control instructions to other components or devices to perform one or more credential validation steps described herein.

These credential validation steps may include receiving a user credential from the user device 104, where the user credential was input by the requesting user 102 as part of a log-on attempt to access the technology resource 108, as described above. For example, the user credential may include a username, a password, a biometric, and/or the like. In response, the credential validation application 210 may identify the technology resource 108 (e.g., using an email or other username input by the requesting user 102) and compare the received user credential to a valid credential for the technology resource 108, for example, stored in the user authentication data 218 of the user data repository 216. As an example, the stored, valid credential may be a stored template username, password, biometric, and/or the like.

If the received user credential matches the stored, valid credential, the credential validation application 210 may grant the user device 104 access to the technology resource 108, such as by generating an access token and transmitting the access token to the user device 104. Otherwise, if the received user credential does not match the stored, valid credential, the credential validation application 210 may determine whether a maximum number of consecutive log-on attempts for the technology resource 108 have been reached. In some embodiments, when an unsuccessful log-on attempt is made, the credential validation application 210 may check a log-on attempt history for the technology resource 108 to determine how many unsuccessful log-on attempts have been made for the technology resource 108 within the same log-on session (e.g., within a certain period of time, such as the last five minutes or the last ten minutes). If the number of unsuccessful log-on attempts made within the same log-on session equals a maximum number of log-on attempts allowed for the technology resource 108, such as four attempts, then the credential validation application 210 may enforce a lockout of the technology resource 108. Otherwise, if the maximum number of unsuccessful log-on attempts has not been reached, the credential validation application 210 may send the user credential to the misappropriation assessment application 212 to perform a misappropriation assessment of the user credential. Alternatively, in some embodiments, the credential validation application 210 may send the user credential to the misappropriation assessment application 212 to perform the misappropriation assessment before determining whether the maximum number of unsuccessful log-on attempts has been reached.

In some embodiments, the misappropriation assessment application 212 may comprise computer-readable instructions associated with one or more authentication steps, or the computer-readable instructions associated with one or more authentication steps may be stored in the processing datastore 214. The misappropriation assessment application 212 may be embodied within the credential validation application 210, in some instances, or the credential validation application 210 may be embodied within the misappropriation assessment application 212, in some instances. In some embodiments, the misappropriation assessment application 212 comprises computer-readable instructions that, when executed by the processing device 204, cause the processing device 204 to perform one or more functions and/or transmit control instructions to other components or devices to perform one or more misappropriation assessment steps described herein.

These misappropriation assessment steps may include evaluating a number of potential misappropriation factors for the user credential. For example, in some embodiments, the misappropriation assessment application 212 may determine a session and/or log-on attempt number for the user credential and its associated log-on attempt. In some embodiments, alternatively or additionally, the misappropriation assessment application 212 may determine a closeness of the received user credential to the stored, valid credential. In some embodiments, alternatively or additionally, the misappropriation assessment application 212 may determine a behavior match score for the log-on attempt associated with the user credential, where the behavior match score measures how closely the behavior of the requesting user 102 matches the behavior of the authorized user 110. In some embodiments, alternatively or additionally, the misappropriation assessment application 212 may determine whether the user device 104 is a trusted user device. In some embodiments, alternatively or additionally, the credential validation application 210 may transmit an authentication code to a user device, which may or may not be the user device 104, in response to receiving the user credential. As such, the misappropriation assessment application 212 may determine whether an authentication code was sent to a user device and, if it was, whether the authentication code was received back from the authorized user 110 and verified by the credential validation application 210. Each of these potential misappropriation factors is discussed in further detail below. Additionally, it should be understood that the potential misappropriation factors listed here are not intended to be exhaustive. As such, in other embodiments, the misappropriation assessment application 212 may evaluate additional or alternative potential misappropriation factors that may be used to determine a likelihood of the log-on attempt being an attempt to misappropriate access to the technology resource 108.

After evaluating the plurality of potential misappropriation factors, the misappropriation assessment application 212 may assign a weight to each of the potential misappropriation factors and determine a misappropriation score from the weighted potential misappropriation factors. For example, the misappropriation assessment application 212 may convert the result of each of the potential misappropriation factors to a numerical value and multiply each numerical value by a weight associated with its respective potential misappropriation factor. Then, the misappropriation assessment application 212 may sum the weighted numerical values to produce the misappropriation score.

Once the misappropriation score for the current log-on attempt has been determined, the misappropriation assessment application 212 may add the misappropriation score to a cumulative misappropriation score for the technology resource 108. The cumulative misappropriation score may be the sum of the misappropriation scores for each previous unsuccessful log-on attempt for the technology resource 108, or at least a subset of previous unsuccessful log-on attempts for the technology resource 108. As such, the cumulative misappropriation score may represent a running tally indicating the likelihood that a third party who is not the authorized user 110 has been attempting to misappropriate the technology resource 108.

The misappropriation assessment application 212 may then determine whether the cumulative misappropriation score has reached or exceeded a threshold. The threshold may represent a maximum potential for misappropriation of the technology resource 108 that the entity is willing to tolerate before determining that an action should be taken to secure access to the technology resource 108. As such, in response to the cumulative misappropriation score reaching or exceeding the threshold, the misappropriation assessment application 212 may enforce a lockout of the technology resource 108. In some embodiments, the misappropriation assessment application 212 may transmit a notification to the authorized user 110 indicating that the authorized user 110 must change the valid credential for the technology resource 108 before the entity system 106 will attempt to validate another submitted user credential. Alternatively, in some embodiments, the misappropriation assessment application 212 may give the requesting user 102 the chance to immediately provide proof that they are the authorized user 110 and change the valid credential for the technology resource 108. If the requesting user 102 cannot provide this proof and change the valid credential, the misappropriation assessment application 212 may lock out the technology resource 108 and transmit the notification to the authorized user 110 indicating that the authorized user 110 must change the valid credential for the technology resource 108.

Additionally, when the authorized user 110 changes the valid credential for the technology resource 108, the misappropriation assessment application 212 may enforce certain rules for the new valid credential submitted by the authorized user 110 before the misappropriation assessment application 212 will accept and set the new valid credential as the stored valid credential for the technology resource 108. These rules may include user-specific credential complexity rules (e.g., user-specific password complexity rules) that have been derived from the log-on attempt history for the technology resource 108 to help the authorized user 110 avoid a valid credential that includes patterns that a third party attempting to misappropriate access to the technology resource 108 has used in their submitted user credentials.

It should be understood that while in FIG. 3, the block diagram 200 of the entity system 106 includes all of the credential validation application 210, misappropriation assessment application 212, processing datastore 214, user authentication data 218, technology resource data 220, in some embodiments, one or more of these applications, datastore, or data may be embodied in a separate system. For example, in some embodiments, the entity system 106 may include the technology resource data 220, and a separate, second system may include the credential validation application 210, misappropriation assessment application 212, processing datastore 214, and user authentication data 218. The second system may electronically communicate with both the entity system 106 and the user device 104, as described herein, to authenticate the requesting user 102 such that the requesting user 102 can access, for example, the technology resource data 220 stored in the user data repository 216 or to determine that the log-on attempt by the requesting user 102 is likely an attempt to misappropriate access to the technology resource 108.

These features will now be described with respect to the process flow 300 of FIG. 4, which illustrates analyzing historical authentication entry attempts to identify misappropriation of a security credential and enforce a change of the security credential, in accordance with some embodiments of the invention. The process flow 300 is shown from the perspective of a system associated with an entity (e.g., the entity system 106) that administers a technology resource (e.g., the technology resource 108) associated with a user authorized to use and manage the technology resource (e.g., the authorized user 110). The process flow 300 is also shown from the perspective of a user device associated with a user requesting access to the technology resource administered by the entity (e.g., the user device 104 associated with the requesting user 102). As indicated by block 302, in some instances, the user device 104 determines whether a user credential has been received from the requesting user 102. For example, the user device 104 may determine whether the requesting user 102 has input a username and password, a biometric, or the like into an application associated with the entity or a website associated with the entity. If not, the user device 104 continues to monitor for the user credential.

Otherwise, if the requesting user 102 has input the user credential in association with a log-on attempt to access the technology resource 108, the user device 104 captures the input user credential, as indicated by block 304. As indicated by block 306, the user device 104 then transmits the user credential to the entity system 106. As indicated by block 308, the entity system 106 accordingly receives the user credential.

After receiving the user credential, the entity system 106 determines whether the user credential is a valid credential for the technology resource 108. In various embodiments, the entity system 106 identifies the technology resource 108 from the user credential (e.g., identifies the technology resource 108 as being associated with an email or other username submitted with the user credential). The entity system 106 then determines whether the user credential matches a stored, valid credential for the technology resource 108, such as a stored password for the technology resource 108, a template biometric for the authorized user 110, or the like. If the user credential matches the stored, valid credential, the entity system 106 grants the requesting user 102 access to the technology resource 108, as indicated by block 312. For example, the entity system 106 may generate an access token for the user device 104 that provides the user device 104 with permission to access the technology resource 108.

Alternatively, in some cases, the requesting user 102 may be required to complete one or more additional authentication steps before the requesting user 102 is given access to the technology resource 108. For example, after validating the user credential, the entity system 106 may generate and send an authentication code to the authorized user 110 as part of a two-factor authentication process. If the requesting user 102 is the authorized user 110, the requesting user 102 should be able to send the authentication code back to the entity system 106, for example, by inputting the authentication code into the user device 104. The entity system 106 may then verify whether the authentication code is correct and, if it is, grant the requesting user 102 access to the technology resource 108. Otherwise, if the requesting user 102 is unable to send the authentication code back to the entity system 106, for example, within a certain amount of time, the entity system 106 may determine that the log-on attempt is an unsuccessful attempt and proceed with block 314 and/or 320 of the process flow 300.

If the user credential does not match the stored, valid credential, the entity system 106 determines whether a maximum number of log-in attempts has been reached, as indicated by block 314. For example, the maximum number of log-in attempts may be the maximum number of unsuccessful log-in attempts allowed for the technology resource 108 within a session, where the session starts with a first invalid user credential, leading to a first invalid log-in attempt, and runs for a period of time. The session may also be specific to the user device 104. As an illustration, the session may include only log-on attempts made from the same user device 104 (e.g., identified based on the Internet Protocol (IP) address of the user device 104), such that each device transmitting a user credential to the entity system 106 may be part of its own session. In some embodiments, to identify whether the maximum number of log-on attempts has been reached, the entity system 106 may check a log-on attempt history for the technology resource 108 and tally the number of unsuccessful log-in attempts made to the technology resource 108, for example, within a certain period of time, from the same user device 104 (e.g., determined using the IP address) within a certain period of time, or the like. The entity system 106 may then determine whether the number of tallied unsuccessful log-in attempts, including the current log-in attempt, equals a maximum number of log-in attempts allowed for the technology resource 108. In other embodiments, each time an unsuccessful log-in attempt is made in a session, the entity system 106 may increase a lockout counter by one until the maximum number of allowed log-on attempts has been reached. Alternatively, the entity system 106 may measure the number of unsuccessful log-in attempts made since the valid credential was last reset for the technology resource 108 when determining whether the maximum number of log-in attempts has been reached.

If the entity determines that the maximum number of log-in attempts has been reached for the technology resource 108, the entity system 106 enforces a lockout of the technology resource 108, as indicated by block 316. In some embodiments, the entity system 106 may transmit a notification to the user device 104 indicating that no log-in attempts will be allowed for a period of time, such as 20 minutes or 2 hours. If the user device 104 submits another user credential within that lockout period of time, the entity system 106 will not attempt to validate the user credential and, in some cases, may further extend the lockout period of time In some embodiments, the entity system 106 may require the authorized user 110 associated with the technology resource 108 to reset the stored, valid credential for the technology resource 108 after the maximum number of unsuccessful log-in attempts has been reached. For example, the entity system 106 may send a notification to the authorized user 110 (e.g., using contact information for the authorized user 110, such as an email or phone number) indicating that the authorized user 110 must reset the valid credential for the technology resource 108 before the entity system 106 will restore the authorized user's access to the technology resource 108. As an illustration, the notification may be an email or a text/SMS message with a link for resetting the valid credential for the technology resource 108. In some cases, before the valid credential can be reset, the authorized user 110 may also have to provide proof of their identity to the entity system 106. For instance, the authorized user 110 may have to correctly answer security questions that the authorized user 110 has set; provide a card number for a card associated with the technology resource 108; provide personal information of the authorized user 110, such as the social security number of the authorized user 110, a driver's license number for the authorized user 110, or one or more pieces of contact information for the authorized user 110 (e.g., an email, a phone number, an address, or the like); receive and verify a phone call or text message at a phone number stored for the authorized user 110; and/or the like.

As another example, the entity system 106 may allow the requesting user 102 the opportunity to immediately provide proof that the requesting user 102 is the authorized user 110. If the requesting user 102 can provide proof that they are the authorized user 110, the requesting user 102 may be allowed to immediately change the valid credential for the technology resource 108. If the requesting user 102 cannot provide proof that they are the authorized user 110, the entity system may send the notification to the authorized user 110 indicating that the authorized user 110 must reset the valid credential for the technology resource 108.

Additionally, the entity system 106 may require that the new valid credential for the technology resource 108 meets certain rules, which may include rules that are specific to the authorized user 110 and the technology resource 108. This is discussed in more detail below with reference to FIG. 6.

As indicated by block 318, the user device 104 may also be included in enforcing the lockout of the technology resource 108. As an example, the user device 104 may receive a GUI from the entity system 106 indicating that the entity system 106 is not accepting any log-in attempts for a certain period of time or until the valid credential for the technology resource 108 is reset, which the user device 104 may display to the requesting user 102.

On the other hand, if the maximum number of log-on attempts has not been reached, the entity system 106 performs a misappropriation assessment, as indicated by block 320. As an illustration, in various embodiments, the misappropriation assessment may include blocks 320*a*, 320*b*, 320*c*, and 320*d* shown FIG. 4.

As indicated by block 320*a*, performing the misappropriation assessment may first include evaluating potential misappropriation factors. In some embodiments, evaluating the potential misappropriation factors may include determining a session and/or a log-on attempt number for the user credential and its associated log-on attempt. For example, the entity system 106 may examine a log-on attempt history for the technology resource 108 and identify any previous log-on attempts that are associated with the current log-on attempt. As an illustration, a log-on attempt may be identified as associated with the current log-on attempt based on the IP address of the user device 104 matching the IP address of a device that submitted the previous log-on attempt, based on the previous log-on attempt being made within a certain period of time before the current log-on attempt, and so on. The entity system 106 may accordingly group the previous log-on attempt(s) associated with the current log-on attempt, if any, as being in the same "session" as the current log-on attempt. Additionally, the entity system 106 may determine which attempt number the current log-on attempt is within the session.

In some embodiments, alternatively or additionally, evaluating the potential misappropriation factors may include determining a closeness of the user credential to the stored, valid credential. For example, determining the closeness of the user credential to the stored, valid credential may include determining which characters in the user credential exactly match characters in the stored, valid credential; determining positions for the matching characters within the user credential compared to positions for the matching characters within the stored valid credential; determining whether characters in the stored, valid credential that are missing from the user credential are replaced in the user credential with common substitutions such that they closely match; and the like.

As an illustration, the entity system 106 may determine that only three characters in the user credential exactly match characters in the stored, valid credential. However, the entity system 106 may also determine that the three matching characters occupy the same positions in user credential as in the stored, valid credential. Additionally, the entity system 106 may determine that, while an uppercase letter is missing from the user credential, it has been replaced by a similar lowercase version of the letter. The entity system 106 may further determine that, while a character is missing from the user credential, it has been replaced by a different character commonly substituted for the missing character, such as a zero being replaced by an uppercase "O" or an "@" sign. In some cases, the entity system 106 may also identify that both the user credential and the stored, valid credential are variations on the same word. The entity system 106 may use these determinations to calculate a measure of the closeness of the user credential to the stored, valid credential, which it may output as a percentage or ratio.

Further, in some cases, determining the closeness of the user credential to the stored, valid credential may also include taking into account the other user credentials received in the same session. As an example, the entity system 106 may determine that the user credential is fairly close to the stored, valid credential because both are variations on the same word, such as both being variations on a U.S. state (e.g., "Colorado"). However, that assessment may be affected by how close the other user credentials received in the same session are to the stored, valid credential and/or to the user credential. For instance, if the other user credentials received in the same session are also variations on the same word as the user credential and the stored, valid credential (e.g., "Colorado"), the entity system 106 may determine that all of the received credentials are similar to the stored, valid credential. On the other hand, if the other user credentials received in the same session are based on different words, such as the names of different U.S. states (e.g., "Oklahoma" and "Arkansas"), the entity system 106 may determine that there is a good likelihood that the current user credential was submitted in an attempt to misappropriate access to the technology resource 108.

In some embodiments, alternatively or additionally, evaluating the potential misappropriation factors may include determining a behavior match score for the log-on attempt associated with the user credential. The behavior match score may measure how closely the behavior of the requesting user 102 matches the behavior of the authorized user 110 associated with the technology resource 108. For example, in some instances, determining the behavior match score may include determining a type of device that the first user device 104 is. To illustrate, the entity system 106 may determine an operating system of the user device 104; whether the user device 104 is a smartphone, tablet computer, laptop computer, desktop computer, or the like; a manufacturer and model of the user device 104; and so on. Then the entity system 106 may determine whether that type of device matches a type of device used to transmit a previous user credential that matched the stored, valid credential. For example, if the authorized user 110 always uses an iOS or macOS operating system to log onto the technology resource 108, and the user credential was received from an Android operating system, this may be an indication that the requesting user 102 is not the authorized user 110.

As another example, the user device 104 may transmit typing data for the requesting user 102 captured when the requesting user 102 input the user credential into the user device 104 (e.g., by typing the user credential, selecting graphical widgets on a GUI associated with a log-on screen or webpage, and the like). The entity system 106 may then accordingly determine a similarity of a typing speed used to input the user credential into the user device 104 and whether and to what extent that typing speed matches a typing speed of the authorized user 110. Additionally, the entity system 106 may determine the type of device the user device 104 is in conjunction with the typing speed, as the behavior of the authorized user 110 when typing may vary depending on the type of device the authorized user 110 is using. For instance, the typing speed of the authorized user 110 may be faster and more fluid on a laptop computer or a desktop computer than on a smartphone or tablet computer.

As another example, the user device 104 may determine a similarity of the user credential to a previous valid credential set by the authorized user 110 to access the technology resource 108. To illustrate, the entity system 106 may determine that a user credential and a previous valid credential are similar in that they are both based on a name of a southwestern state, both include a capitalized second letter, and both include the substitution of the "@" sign for "a". If the user credential received from the user device 104 is not similar to the current, valid credential for the technology resource 108 but is very similar to a previous, valid credential for the technology resource 108, the entity system 106 may determine, for example, that the requesting user 102 is likely the authorized user 110 who has simply forgotten that the credential for the technology resource 108 was changed.

In some embodiments, the entity system 106 may use machine learning to identify measures of the behaviors of the authorized user 110, such as by analyzing device information, typing information, the user credential, and so on from successful log-in attempts where the submitted user credential matched the stored, valid credential. The entity system 106 may then evaluate the same measures in the behavior of the requesting user 102, based on information transmitted by the user device 104, to determine how well the behavioral measures of the requesting user 102 match the behavioral measures of the authorized user 110.

Determining the behavior match score may include performing any one or combination of these determinations, in addition to other types of behavior determinations described here and/or by substituting other types of behavior determinations not described here. Based on the results of these behavior determinations, the entity system 106 may generate a score indicating how well the behavior of the requesting user 102 matches the behavior of the authorized user 110. For example, the entity system 106 may translate each of the results of the determinations used into a numerical value and use an algorithm (e.g., which assigns weights to the numerical values) to output a percentage score for the requesting user 102.

In some embodiments, alternatively or additionally, evaluating the potential misappropriation factors may include determining whether the user device 104 is a trusted user device. As an illustration, the entity system 106 may ask the authorized user 110 whenever the authorized user 110 successfully logs onto the technology resource 108 using a new device whether the device is a trusted device. For example, a trusted device may be considered a personal device that the authorized user 110 will likely use to log onto the technology resource 108 again, as opposed to a device that the authorized user 110 will not use again, such as a public computer. If the authorized user 110 indicates that the device is a trusted device, the entity system 106 may record, for example, the IP address of the device as a trusted IP address. Accordingly, the entity system 106 may determine whether the user device 104 being used by the requesting user 102 is one of the trusted devices designated by the authorized user 110, for example, based on the IP address of the user device 104.

In some embodiments, alternatively or additionally, evaluating the potential misappropriation factors may include determining whether an authentication code associated with the log-on attempt has been sent to the authorized user 110 and verified. Accordingly, in some cases, once the entity system 106 has received the user credential, the entity system 106 may transmit an authentication code to a device associated with the authorized user 110. This device may or may not be the user device 104. For instance, the entity system 106 may store a cellphone number for the authorized user 110 and text the authentication code to the cellphone number. If the cellphone number is associated with the user device 104, the authentication code will be sent to the user device 104. Otherwise, the authentication code will be sent to a different device. In some cases, this authentication code may be transmitted to the user device 104 as part of a two-factor authentication process.

If the authorized user 110 is the requesting user 102, the authorized user 110 can then use the authentication code to confirm that the log-on request came from the authorized user 110, for example, by inputting the authentication code into a screen displayed on the user device 104. The device being used by the authorized user 110 may transmit the input authentication code to the entity system 106, and the entity system 106 may verify whether the input authentication code matches the authentication code that was sent to the authorized user 110. If the authorized user 110 is not the requesting user 102, the authorized user 110 may instead be notified by receipt of the authentication code that a third party is attempting to misappropriate the technology resource 108 and be able to report this accordingly to the entity system 106.

Transmitting the authentication code may occur at any point between and inclusive of the entity system 106 receiving the user credential at block 308 and performing the misappropriation assessment at block 320. As an illustration, the entity system 106 may transmit the authentication code after receiving the credential from the user device 104 but before determining whether the user credential is valid. For example, the entity system 106 may identify the technology resource 108 that the requesting user 102 is attempting to access via a username the requesting user 102 has input, identify the authorized user 110 associated with that technology resource 108 and the contact information for the authorized user 110, and transmit an authentication code to the authorized user 110 using the contact information. As another illustration, the entity system 106 may transmit the authentication code after determining that the user credential is invalid and after determining that the maximum number of log-on attempts has not been reached.

Accordingly, one of the potential misappropriation factors may be determining whether an authentication code was sent to the authorized user 110. If the authentication code was sent, the entity system 106 may determine whether an authentication code input by the authorized user 110 was received and whether that input authentication code was successfully verified against the authentication code that was sent to the authorized user 110. If the authentication code was verified, it may be an indication that the log-on attempt is a legitimate attempt by the authorized user 110 to access the technology resource. If an input authentication code was not received, or if an input authentication code was received but could not be verified, it may be an indication that the log-on attempt is not a legitimate attempt by the authorized user 110 to access the technology resource and is instead an attempt to misappropriate the technology resource 108.

As such, the entity system 106 may identify one, all, or a combination of the potential misappropriation factors discussed here. Moreover, it should be understood that these potential misappropriation factors are not intended to be exhaustive and that, in some embodiments, additional or alternative potential misappropriation factors may be evaluated by the entity system 106 as part of a misappropriation assessment.

As indicated by block 320*b*, the entity system 106 may then weight the potential misappropriation factors. In some embodiments, the entity system 106 may convert each of the potential misappropriation factors into a numerical value. For example, the entity system 106 may (1) identify the attempt number of the current log-in attempt as a first numerical value, (2) weigh various measures of closeness of fit between the received user credential and the stored, valid credential to determine a percentage of closeness of fit for a second numerical value, (3) identify the behavior match score as a third numerical value, (4) assign a value of "0" if the user device 104 is a trusted user device or assign a value of "1" if the user device 104 is not a trusted device as a fourth numerical value, and (5) assign a value of "0" if an authentication code was sent to the authorized user 110 and verified or if an authentication code was not sent to the authorized user 110, or a value of "1" if an authentication code was sent to the authorized user 110 and not verified. After converting each of the potential misappropriation factors into a numerical value, the entity system 106 may multiply each numerical value by a weight that both (a) compensates for the different measurement scales used for each potential misappropriation factor and (b) will ensure that each potential misappropriation factor only makes up a desired portion of an overall misappropriation score determined from the weighted factors.

As an illustration, the entity system 106 may assign weights such that 10% of an overall misappropriation score is based on the attempt number, 30% of the score is based on the closeness of fit, 15% of the score is based on the behavior match score, 20% of the score is based on whether the user device 104 is a trusted device, and 25% of the score is based on whether an authentication code was sent and verified. In some cases, the weights may also ensure that the misappropriation score determined from the weighted factors is maintained within a certain range, such as between 0 and 10 or between 0 and 20, while in other cases, the misappropriation score may not be constrained to a particular range.

As indicated by block 320*c*, once the potential misappropriation factors have been weighted, the entity system 106 may determine a misappropriation score for the user credential. In some embodiments, the entity system 106 may multiply the numerical value for each potential misappropriation factor by its associated weight. The entity system 106 may then add the multiplied numerical values to produce the misappropriation score. Alternatively, in other embodiments, the entity system 106 may use a different algorithm to determine the misappropriation score, such as by using an algorithm that outputs a misappropriation score based on whether each of the potential misappropriation factors produces a certain result or meets a certain threshold.

As indicated by block 320*d*, the entity system 106 may add the misappropriation score to a cumulative misappropriation score for the technology resource 108. Accordingly, in various embodiments, the entity system 106 may maintain the cumulative misappropriation score as a cumulative running total of the misappropriation scores for the technology resource 108 determined from previous unsuccessful log-on attempts. In some cases, the entity system 106 may reset the cumulative misappropriation score whenever the authorized user 110 resets the valid credential for the technology resource 108. In other cases, the cumulative misappropriation score may reflect all of the misappropriation scores determined for the technology resource 108. Generating this updated cumulative misappropriation score may end the misappropriation assessment, as shown in FIG. 4.

Returning back to the main portion of the process flow 300, after the entity system 106 has determined the updated cumulative misappropriation score, the entity system 106 may determine whether the cumulative misappropriation score has reached or exceeded a threshold, as indicated by block 322. The threshold may always be the same for the technology resource 108, such as where the cumulative misappropriation score reflects a running total since the last time the authorized user 110 reset the valid credential for the technology resource 108, or the threshold may increase over time, such as where the cumulative misappropriation score reflects all of the misappropriation scores determined for the technology resource 108. For example, if the cumulative misappropriation score reflects all of the misappropriation scores, the threshold may initially be 100. After the threshold of 100 has been met or exceeded, the threshold may be increased to 200. After the threshold of 200 has been met or exceeded, the threshold may be increased to 275, reflecting the fact that the threshold has been met/exceeded twice already and, accordingly, the technology resource 108 may be considered at a higher likelihood for misappropriation.

As indicated by block 316, if the threshold has been reached or exceeded, the entity system enforces a credential lockout of the technology resource 108. The credential lockout may be the same type of lockout enforced in response to the maximum number of log-in attempts being reached, as discussed above. For example, the entity system 106 may block all attempts to log into the technology resource 108 for a certain period of time, or the entity system 106 may require a reset of the valid credential.

In some embodiments, the lockout that occurs after the maximum number of log-in attempts has been reached may be the same as the credential lockout that occurs after the threshold for the cumulative misappropriation score has been reached. In other embodiments, the lockout that occurs after the maximum number of log-in attempts has been reached may be different from the credential lockout that occurs after the threshold for the cumulative misappropriation score has been reached. As an illustration, in response to the maximum number of log-in attempts being reached, the entity system 106 may block all attempts to log into the technology resource 108 for a certain period of time. Conversely, in response to the threshold for the cumulative misappropriation score being reached, the entity system 106 may require the authorized user 110 to change the valid credential for the technology resource 108 before the entity system 106 will accept another user credential and log-in attempt. When the authorized user 110 changes the valid credential for the technology resource 108, the new valid credential may be required to follow certain rules, as discussed further below with respect to FIG. 6. Additionally, the entity system 106 may further require the authorized user 110 to provide proof of their identity to the entity system 106 in order to change the stored, valid credential, as described above. As indicated by block 318, the user device 104 may also be included in enforcing the credential lockout of the technology resource, such as by receiving and displaying a GUI from the entity system 106 indicating that the valid credential for the technology resource 108 must be reset before the entity system 106 will accept additional log-in attempts for the technology resource 108.

Otherwise, if the threshold for the cumulative misappropriation score has not been reached or exceeded, the entity system 106 may allow the requesting user 102 to submit another user credential as part of another log-on attempt, as indicated by block 324. For example, the entity system 106 may transmit a GUI to the user device 104 indicating that the user credential the requesting user 102 entered is invalid but that the requesting user 102 may input another user credential and try to log in again. Accordingly, the user device 104 may return to determining whether the requesting user 102 has input a user credential.

It should be understood that the process flow 300 is exemplary and that, in some embodiments, modifications may be made to the process flow 300. For example, in some embodiments, the entity system 106 may not determine whether the maximum number of log-in attempts has been reached, as described above with respect to block 314, or the entity system 106 may determine whether the maximum number of log-in attempts has been reached after performing the misappropriation assessment. As another example, in some embodiments, the entity system 106 may receive the user credential as part of a two-factor authentication process. As such, if the user credential is a valid credential, as discussed above with respect to blocks 310 and 312, the entity system 106 may transmit an authentication code to a device associated with the authorized user 110 that the authorized user 110 must correctly send back to the entity system 106 before the entity system 106 will grant the user access to the technology resource 108. Alternatively, in some embodiments, the process flow 300 may include a step of transmitting an authentication code to a device associated with the authorized user 110 as part of the performing the misappropriation assessment, as discussed above with respect to block 320 (e.g., as part of evaluating potential misappropriation factors, as discussed above with respect to block 320a).

FIGS. 5A and 5B illustrate an exemplary log 500 of historical unsuccessful authentication entry attempts and a cumulative misappropriation score, in accordance with some embodiments of the invention. The log 500 is an example record of historical unsuccessful authentication entry attempts to access a technology resource (e.g., the technology resource 108) administered by a system associated with an entity (e.g., the entity system 106), where the technology resource is associated with a user authorized to use and manage the technology resource (e.g., the authorized user 110). The actual password for the technology resource 108 is represented in block 502 by "STATE1", with the actual password being a variation on a state name. As further shown by block 502, the maximum number of log-in attempts for the technology resource 108 is six.

The log 500 includes columns documenting potential misappropriation factors for each entry, or log-in attempt. In the example of log 500, the potential misappropriation factors include (1) a session for the log-in attempt, (2) the attempt number for the log-in attempt, (3) the user credential (e.g., password) used for the log-in attempt, (4) the behavior match score for the log-in attempt, (5) whether the device being used to request access via the log-in attempt (e.g., the user device 104 associated with the requesting user 102) is a trusted device, (6) whether an authentication code was triggered as a result of the log-in attempt, and (7) if an authentication code was triggered, whether the authentication code was received from the authorized user 110 and verified by the entity system 106.

Additionally, the log 500 includes a column showing the misappropriation score calculated for the log-in attempt, where each misappropriation score entry includes both the score for the log-in attempt and a rating as to whether the score indicates that the log-in attempt showed a "low probability" of being an attempt at misappropriation, a "medium probability" of being an attempt at misappropriation, or a "high probability" of being an attempt at misappropriation. As an illustration, in the example log 500, a score from 0 to 3 is considered "low probability," a score from 4 to 6 is considered "medium probability," and a score of 7 or above is considered "high probability."

Finally, the log 500 includes a column showing the cumulative misappropriation score, which represents a running total of the misappropriation scores for the current and previous log-on attempts. In the example of the log 500, the cumulative score begins at zero and is accordingly increased from zero starting with a first log-on attempt 504 shown in log 500. As such, in some embodiments, the first log-on attempt 504 is the first log-on attempt ever made for the technology resource 108. Alternatively, in other embodiments, the first log-on attempt 504 is the first log-on attempt made since the authorized user 110 changed the valid credential for the technology resource 108.

Referring to the entries in the log 500 shown in FIG. 5A, log-on attempts 504, 506, 508, 510, and 512 are all associated with the same session (e.g., session "ABC"). All of the log-on attempts 504, 506, 508, 510, and 512 have relatively low behavior match scores (e.g., between 3% and 8%), and none of them came from a trusted device. These may be factors indicating that the log-on attempts 504, 506, 508, 510, and 512 are potentially misappropriation attempts. As such, the misappropriation scores for the log-on attempts 504, 506, 508, 510, and 512 are medium to high (e.g., between 4 and 11), where the differences in the scores between the log-on attempts 504, 506, 508, 510, and 512 may be due, for example, to the attempt number and the password used.

As an illustration, the log-on attempt 506 may have the lowest misappropriation score of 4 because the log-on attempt 506 was the second log-on attempt in session ABC, and earlier log-on attempts in a session may be considered less likely to indicate misappropriation than later log-on attempts. The log-on attempt 506 may also have the lowest misappropriation score in the session because the log-on attempt 506 included a password that is very similar to the actual password. For example, as shown, the password for the log-on attempt 506 is represented by "STATE1A" and is therefore another variation on the same state name as the actual password (e.g., with the actual password replacing an "i" of the state name with a "1" and an "o" of the state name with an "@" sign, and the log-on attempt 506 password replacing the "i" with the "1" but instead replacing an "a" of the state name with an "@" sign). Alternatively, in some embodiments, the log-on attempt 506 may instead be considered at a higher likelihood for misappropriation due to the fact that the used credential of the log-on attempt 506 is similar to the valid credential but none of the other user credentials from the same session is similar to either the user credential from the log-on attempt 506 or the valid credential. As such, this may indicate that the requesting user 102 was lucky in selecting a user credential similar to the valid credential for the technology resource, rather than being the authorized user 110 misremembering or mistyping the valid credential. In some cases, the entity system 106 may retroactively increase the misappropriation score for the log-on attempt 506 due to the later-received user credentials entered in session ABC being dissimilar from the user credential for the log-on attempt and from the valid credential.

Conversely, the log-on attempt 512 may have the highest misappropriation score of 11 because the log-on attempt 512 was the fifth log-on attempt in session ABC, and thus the last unsuccessful log-on attempt that could be made before an additional unsuccessful log-on attempt would lock the technology resource 108. This may be an indication of potential misappropriation, as a third party trying to gain illegitimate access to the technology resource 108 may stop log-on attempts to access the technology resource 108 once an additional unsuccessful log-on attempt would reach the maximum allowed attempts, thereby locking out the technology resource 108 and alerting the authorized user 110 that the third party is attempting to gain illegitimate access to the technology resource 108. Additionally, the log-on attempt 512 may have the highest misappropriation score in the session because the password used is not similar to the valid password. For example, as shown, the password used for the log-on attempt 512 is represented by "UNIVERSITY1", and thus the password used for the log-on attempt 512 is based on the name of a university rather than the name of a U.S. state. As such, the password from the log-on attempt 512 is not similar to the valid password because there may be few matches between the letters of the two passwords, and the entity system 106 may further be able to determine that the two passwords are based on different words.

Log-on attempts 514, 516, 518, 520, 522, and 524 are also all associated with the same session (e.g., session "DEF"). However, with the exception of the log-on attempt 514, all of the log-on attempts 516, 518, 520, 522, 524 have high behavior match scores (e.g., 52% for the log-on attempt 514 but between 86% and 90% for the log-on attempts 516, 518, 520, 522, and 524). Additionally, each of the log-on attempts 514, 516, 518, 520, 522, and 524 came from a trusted device and included a password that is a variation on the same state name used as the basis for the actual password (e.g., as represented by "STATE1B", "STATE1C", "STATE1D", "STATE1E", "STATE1F", and "STATE1G"). These may be factors indicating that the log-on attempts 514, 516, 518, 520, 522, and 524 are legitimate attempts to access the technology resource 108. As such, the misappropriation scores for the log-on attempts 514, 516, 518, 520, 522, and 524 are all 0, except for the log-on attempt 514 with a misappropriation score of 1. The difference in the misappropriation score for the log-on attempt 514 may be due, for example, to the lower behavior match score of 52% for the log-on attempt 514.

As shown in the log 500, the log-on attempt 524 was the sixth log-in attempt in session DEF. Because later log-on attempts may be seen as more likely to indicate misappropriation, this may normally be considered an indication of misappropriation. Additionally, the entity system 106 may normally require the authorized user 110 to reset the valid credential for the technology resource 108 after the sixth unsuccessful log-in attempt. However, as shown in the log 500, the log-on attempt 524 triggered the entity system 106 to transmit an authentication code to the authorized user 110. For example, the authentication code may have been triggered because the log-on attempt 524 was the sixth and final allowed attempt for session DEF. Further, as shown, the authentication code was received back from the authorized user 110 and verified by the entity system 106. Accordingly, the misappropriation score for the log-on attempt 524 may still be 0 because the authentication code was triggered and verified. Moreover, in some cases and as shown in the log 500, the entity system 106 may not require the authorized user 110 to reset the valid credential when an authentication code is triggered and verified. For instance, the entity system 106 may instead enforce a timed lockout of the technology resource 108 or no lockout of the technology resource 108.

Referring to the entries in the log 500 shown in FIG. 5B, log-on attempts 526, 528, 530, 532, and 534 are all associated with the same session (e.g., session "GHI"). All of the log-on attempts 526, 528, 530, 532, and 534 have relatively low behavior match scores, though these scores are slightly higher than for the behavior match scores of session ABC (e.g., between 4% and 19%), and none of them came from a trusted device. These, again, may be factors indicating that the log-on attempts 526, 528, 530, 532, and 534 are potentially misappropriation attempts. As such, the misappropriation scores for the log-on attempts 526, 528, 530, 532, and 534 are medium to high (e.g., between 4 and 8). The differences in the scores between the log-on attempts 526, 528, 530, 532, and 534 may be due, for example, to the attempt number, password used, and variations in the behavior match scores.

As an illustration, the log-on attempt 530 may have the lowest misappropriation score of 4 because the log-on attempt 530 included a slightly higher behavior match score of 16% and the log-on attempt 530 included a password that is at least somewhat similar to the valid password. For example, as shown, the requesting user 102 used a password that is a variation on a name of a different U.S. state from the actual password, as represented by "STATE4". In some cases, the entity system 106 may also determine that the similarity is higher based on there being a connection between the authorized user 110 and a word used as a basis for the submitted password, such as the authorized user 110 having lived in the state used for "STATE4". The entity system 106 may also determine, for example, that both the password for the log-on attempt 530 and the actual password include a capitalized first letter and similar character or number substitutions for letters.

By contrast, the log-on attempt 534 may have the highest misappropriation score in the session because the log-on attempt 534 was the fifth log-on attempt in session GHI and because the log-on attempt 534 included a password that was less similar to the valid password. As an example, as shown, the requesting user 102 used a password that is also a variation on a name of a different U.S. state from the actual password, as represented by "STATE6". While "STATE6" may seem as similar to "STATE1" as "STATE4" from the log-on attempt 530, the entity system 106 may determine, for example, that the authorized user 110 has no connection to the state used for "STATE6", such that the use of this input password indicates a higher likelihood of misappropriation.

Finally, log-in attempts 536, 538, 540, 542, and 544 are also all associated with the same session (e.g., session "JKL"). Similar to the attempts from session ABC and session GHI, the log-on attempts 536, 538, 540, and 542 have relatively low behavior match scores (e.g., between 7% and 10%), and none of them came from a trusted device. As such, the misappropriation scores for the log-on attempts 536, 538, 540, and 542 are high (e.g., between 7 and 11). However, as further shown in the log 500, after the log-in attempt 542, the cumulative misappropriation score for the technology resource 108 reached 104. In the example of FIGS. 5A and 5B, the threshold for the cumulative misappropriation score may be 100. As such, the entity system 106 instituted a credential lockout of the technology resource 108 after log-in attempt 542 caused the cumulative misappropriation score to exceed 100. Thus, while the entity system 106 received the log-in attempt 544, the entity system 106 did not process the log-in attempt 54 due to the lockout. In some cases, the lockout may not be removed until the authorized user 110 changes the valid credential for the technology resource 108.

FIG. 6 illustrates a high-level process flow 600 for changing a valid credential for a technology resource, in accordance with some embodiments of the invention. In the example of FIG. 6, the valid credential being changed is a password. The process flow 600 is shown from the perspective of a system associated with an entity (e.g., the entity system 106) that administers a technology resource (e.g., the technology resource 108) associated with a user authorized to use and manage the technology resource (e.g., the authorized user 110). For example, when the entity system 106 notifies the authorized user 110 that the authorized user 110 must change the valid credential for the technology resource 108 as a result of block 316 of FIG. 4, the entity system 106 may transmit a link to the authorized user 110 that allows the authorized user 110 to change the valid credential. Alternatively, the notification may otherwise include instructions for changing the valid credential (e.g., instructions for changing the password via a website associated with the entity system 106, instructions for changing the password via an application associated with the entity system 106, or the like). As such, when the authorized user 110 begins the process for changing the valid credential, the process flow 600 may be initiated.

As indicated by block 602, the entity system 106 first determines whether a new password that could be potentially used to replace the currently stored password for the technology resource 108 (e.g., a new potential valid credential) has been received from a device associated with the authorized user 110 For example, the entity system 106 may transmit a GUI to be displayed on the device the authorized user 110 is using to reset the password that includes input fields whereby the authorized user 110 can input the new password, as well as rules the new password must follow before it will be accepted as the new stored, valid password for the technology resource 108. These rules are discussed in further detail below. If the new password has not been received, the entity system 106 continues to monitor for the new password.

Otherwise, if the new password has been received, the entity system 106 determines whether the new password satisfies generic password complexity rules, as indicated by block 604. In various embodiments, the generic password complexity rules may be rules that apply to passwords used by all users maintaining a technology resource with the entity system 106. In some embodiments, the generic password complexity rules may require the new password to include a certain number of character types. Character types may include lowercase letters, uppercase letters, numbers, and/or special characters (e.g., non-alphanumeric symbols on a standard keyboard). For example, the entity system 106 may require the password to include at least one uppercase letter, at least one number, and at least two special characters.

In some embodiments, alternatively or additionally, the generic password complexity rules may require the new password to be of a certain length, such as a length of N characters. For example, the entity system 106 may require the password to be at least eight characters long. In some cases, the generic password complexity rules may also have an upper limit on the length of the password, such as a length of N+6 characters.

In some embodiments, alternatively or additionally, the generic password complexity rules may require the new password to be different from a previous password used for the technology resource 108. In some cases, the new password must be different from a certain number of previous passwords. For example, the entity system 106 may require the password to be different from the previous five passwords, including the current stored password, for the technology resource 108. Further, in some cases, the entity system 106 may require the new password to have a certain number of differences, such as five differences, from all of a certain number of previous passwords.

In some embodiments, alternatively or additionally, the generic password complexity rules may require the new password to not include a commonly used password or password portion. For example, the entity system 106 may reject a new password submitted by the authorized user 110 that includes "password" or a variation thereof, that includes "123", that includes another set of consecutive numbers, and/or the like.

If the new password does not satisfy the generic password complexity rules, the entity system 106 rejects the password and requires the authorized user 110 to input another new password, as indicated by block 606. For example, the entity system 106 may transmit a notification to the device the authorized user 110 is using to input the new password indicating the violations of the generic password complexity rules and instruction the authorized user 110 to input another new password that follows the generic password complexity rules. The entity system 106 then returns to monitoring for a new password from the authorized user 110. It should be understood that these generic password complexity rules are not intended to be exhaustive. In other embodiments, additional or alternative password rules may be used for the process of resetting the password for a technology resource.

On the other hand, if the new password does satisfy the generic password complexity rules, the entity system 106 then determines whether the new password satisfies user-specific password complexity rules, as indicated by block 608. In some embodiments, the user-specific password complexity rules are based on an analysis of attempts to misappropriate the technology resource 108. As such, the user-specific password complexity rules may be based on a history of unsuccessful log-in attempts for the technology resource 108, such as the log 500 shown in FIGS. 5A and 5B. The entity system 106 may analyze the passwords used in the log of unsuccessful log-in attempts to identify patterns in the unsuccessful log-in attempts. Further, in some cases, the entity system 106 may weigh passwords associated with a greater likelihood of misappropriation, such as higher misappropriation scores, in identifying the patterns in unsuccessful log-in attempts. This may be done, for example, so as not to disallow password patterns that the authorized user 110 uses in their passwords (e.g., that may help the authorized user 110 remember the password) and may show up in the history of unsuccessful log-in attempts due to the authorized user 110 mistyping or misremembering the password, but which have not been used in unsuccessful attempts that are more likely attributed to a third party attempting to misappropriate access to the technology resource 108.

As an illustration, referring back to FIGS. 5A and 5B, the entity system 106 may determine that the history of unsuccessful log-in attempts includes a number of attempts based on state names (e.g., based on the passwords represented by "STATE2", "STATE3", "STATE4", "STATE5", "STATE6", and "STATE?"), large city names (e.g. based on the passwords represented by "CITY1", "CITY2", and "CITY3"), and college/university names (e.g., based on the passwords represented by "UNIVERSITY1", "UNIVERSITY2", "UNIVERSITY 3", "UNIVERSITY4", and "UNIVERSITY5"). Accordingly, the entity system 106 may generate rules specific to the authorized user 110 disallowing the use of a password that includes or is based on a state name, city name, or college/university name, including passwords that omit a few letters of the name (e.g., omit the last letter of a U.S. state) or rearrange the letters of the name (e.g., by moving the first two letters of a U.S. state to the end of the word).

As another illustration, the entity system 106 may determine that the history of unsuccessful log-in attempts includes a number of attempts in which certain numbers or symbols were used in place of letters (e.g., the "@" sign in place of "a" or "o", "1" in place of "i", and "0" in place of "o"). As such, the entity system 106 may generate rules specific to the authorized user 110 that prohibit the use of these common substitutions. In some cases, the entity system 106 may prohibit some of the commonly substituted numbers or symbols altogether in passwords input by the authorized user 110, such as the "@" sign (e.g., because it is commonly substituted for "a" or "o"), the number "1" (e.g., because it is commonly substituted for "i" or "1"), the number "3" (e.g., because it is commonly substituted for "3"), or the symbol "$" (e.g., because it is commonly substituted for "s").

In some embodiments, the user-specific password complexity rules may be based on the previous unsuccessful user credentials received since the last password change. In some embodiments, the user-specific password complexity rules may additionally be based on previous unsuccessful user credentials received before the last password change. For example, any user-specific password complexity rules that were enforced the last time the authorized user 110 had to change their password for the technology resource 108 may be enforced again.

Further, in some embodiments, the entity system 106 may analyze the current and/or other previous passwords used by the authorized user 110 to determine if the authorized user 110 has been using a pattern in their passwords that a third party may be able to crack. For instance, in the authorized user 110 has a history of using the names of family members as part of their passwords, the entity system 106 may reject any new password input by the authorized user 110 that includes or is otherwise based on a name.

If the new password does not satisfy the user-specific password complexity rules, the entity system 106 rejects the password and requires the authorized user 110 to input another password, as again indicated by block 606. On the other hand, if the new password, does satisfy the user-specific password rules, the entity system 106 then sets the new password as the new valid password for the technology resource 108. For example, the entity system 106 may move the current valid password for the technology resource 108 to a log of previous valid passwords used for the technology resource 108. Additionally, the entity system 106 may store the new password as the new valid password for the technology resource 108 in the user authentication data 218 of the user data repository 216.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying potential misappropriation attempts into a technology resource and enforcing a credential lockout, the system comprising:
    a memory device with computer-readable program code stored thereon;
    a communication device; and
    a processing device operatively coupled to the memory device and communication device, wherein the processing device is configured to execute the computer-readable program code to:
        receive a first user credential from a first user device, wherein the first user credential is associated with a first log-on attempt to access a technology resource;
        determine whether the first user credential matches a stored valid credential for the technology resource;
        in response to determining that the first user credential does not match the stored valid credential, perform a misappropriation assessment, wherein the misappropriation assessment comprises:
            evaluating a plurality of potential misappropriation factors for the first log-on attempt;
            weighting the plurality of potential misappropriation factors;
            determining a misappropriation score from the weighted plurality of potential misappropriation factors; and
            adding the misappropriation score to a cumulative misappropriation score for the technology resource, wherein the cumulative misappropriation score comprises at least one previous misappropriation score associated with a previous user credential and a previous log-on attempt;
        determine whether the cumulative misappropriation score has reached or exceeded a threshold; and
        in response to the cumulative misappropriation score reaching or exceeding the threshold, enforce a credential lockout for the technology resource.

2. The system of claim 1, wherein the processing device is further configured to:
    before performing the misappropriation assessment, determine whether a maximum number of log-on attempts has been reached within a session, the session comprising a period of time in which at least one user credential, including the first user credential, has been received, wherein each user credential is associated with a log-on attempt; and
    perform the misappropriation assessment further in response to determining that the maximum number of log-on attempts has not been reached.

3. The system of claim 1, wherein evaluating the plurality of potential misappropriation factors comprises at least one of:
- determining a session for the first user credential, the session comprising a period of time in which at least one user credential, including the first user credential, has been received;
- determining a log-on attempt number for the first user credential, wherein the log-on attempt number represents a number of consecutive log-on attempts for the technology resource;
- determining a closeness of the first user credential to the stored valid credential;
- determining a behavior match score for the first log-on attempt;
- determining whether the first user device is a trusted user device; or
- determining whether an authentication code was sent to a user device associated with an authorized user of the technology resource based on the first log-on attempt and, in response to determining that the authentication code was sent, determining whether the authentication code was received back from the authorized user and verified.

4. The system of claim 3, wherein evaluating the plurality of potential misappropriation factors comprises determining the closeness of the first user credential to the stored valid credential, and wherein determining the closeness of the first user credential to the stored valid credential comprises:
- determining which characters in the first user credential match characters in the stored valid credential; and
- determining positions for the matching characters within the first user credential compared to positions for the matching characters within the stored valid credential.

5. The system of claim 3, wherein evaluating the plurality of potential misappropriation factors comprises determining the behavior match score of the first log-on attempt, and wherein determining the behavior match score comprises at least one of:
- determining a type of the first user device and whether the type of the first user device matches a type of device used to transmit a previous user credential that matched the stored valid credential;
- determining a similarity of a typing speed used to input the first user credential into the first user device and whether the typing speed used to input the first user credential matches a typing speed of an authorized user of the technology resource; or
- determining a similarity of the first user credential to a previous stored valid credential used for the technology resource.

6. The system of claim 1, wherein enforcing the credential lockout comprises sending a notification to an authorized user of the technology resource, the notification indicating that the authorized user must reset the stored valid credential for the technology resource before additional log-on attempts to access the technology resource can be made.

7. The system of claim 6, wherein the processing device is further configured to:
- after enforcing the credential lockout for the technology resource, receive a new potential valid credential;
- evaluate whether the new potential valid credential satisfies a plurality of generic credential complexity rules for setting a new stored valid credential;
- evaluate whether the new potential valid credential satisfies a plurality of user-specific credential complexity rules for setting a new stored valid credential; and
- in response to determining that the new potential valid credential satisfies the plurality of generic credential complexity rules and the plurality of user-specific credential complexity rules, reset the new potential valid credential as the new stored valid credential for the technology resource.

8. The system of claim 7, wherein the processing device is further configured to:
- receive proof of an identity of an individual submitting the new potential valid credential;
- verify that the proof supports a conclusion that the individual is the authorized user of the technology resource; and
- set the new potential valid credential as the stored valid credential for the technology resource further in response to verifying that the proof supports the conclusion that the individual is the authorized user.

9. The system of claim 7, wherein the plurality of generic credential complexity rules comprises at least one of:
- requiring the new stored valid credential to comprise a certain number of character types;
- requiring the new stored valid credential to be of at least a certain length;
- requiring the new stored valid credential to be different from a previous stored valid credential for the technology resource; or
- requiring the new stored valid credential to not include a commonly used credential.

10. The system of claim 7, wherein the plurality of user-specific credential complexity rules are based on an analysis of a plurality of previous user credentials, the analysis identifying one or more patterns in the plurality of user credentials, wherein each previous user credential is associated with an unsuccessful log-on attempt to access the technology resource.

11. A computer-implemented method for identifying potential misappropriation attempts into a technology resource and enforcing a credential lockout, the method comprising:
- receiving a first user credential from a first user device, wherein the first user device is associated with a first log-on attempt to access a technology resource;
- determining whether the first user credential matches a stored valid credential for the technology resource;
- in response to determining that the first user credential does not match the stored valid credential, performing a misappropriation assessment, wherein the misappropriation assessment comprises:
  - evaluating a plurality of potential misappropriation factors for the first log-on attempt;
  - weighting the plurality of potential misappropriation factors;
  - determining a misappropriation score from the weighted plurality of potential misappropriation factors; and
  - adding the misappropriation score to a cumulative misappropriation score for the technology resource, wherein the cumulative misappropriation score comprises at least one previous misappropriation score associated with a previous user credential and a previous log-on attempt;
- determining whether the cumulative misappropriation score has reached or exceeded a threshold; and
- in response to the cumulative misappropriation score reaching or exceeding the threshold, enforcing a credential lockout for the technology resource.

12. The computer-implemented method of claim 11, further comprising:
    before performing the misappropriation assessment, determining whether a maximum number of log-on attempts has been reached within a session, the session comprising a period of time in which at least one user credential, including the first user credential, has been received, wherein each user credential is associated with a log-on attempt;
    wherein performing the misappropriation assessment comprises performing the misappropriation assessment further in response to determining that the maximum number log-on attempts has not been reached.

13. The computer-implemented method of claim 11, wherein evaluating the plurality of misappropriation factors comprises at least one of:
    determining session for the first user credential, the session comprising a period of time in which at least one user credential, including the first user credential, has been received;
    determining a log-on attempt number for the first user credential, wherein the log-on attempt number represents a number of consecutive log-on attempts for the technology resource;
    determining a closeness of the first user credential to the stored valid credential;
    determining a behavior match score for the first log-on attempt;
    determining whether the first user device is a trusted user device; or
    determining whether an authentication code was sent to a user device associated with an authorized user of the technology resource based on the first log-on attempt and, in response to determining that the authentication code was sent, determining whether the authentication code was received back from the authorized user and verified.

14. The computer-implemented method of claim 13, wherein evaluating the plurality of potential misappropriation factors comprises determining the closeness of the first user credential to the stored valid credential, and wherein determining the closeness of the first user credential to the stored valid credential comprises:
    determining which characters in the first user credential match characters in the stored valid credential; and
    determining positions for the matching characters within the first user credential compared to positions for the matching characters within the stored valid credential.

15. The computer-implemented method of claim 13, wherein evaluating the plurality of potential misappropriation factors comprises determining the behavior match score for the first log-on attempt, and wherein determining the behavior match score comprises at least one of:
    determining a type of the first user device and whether the type of the first user device matches a type of device used to transmit a previous user credential that matched the stored valid user credential;
    determining a similarity of a typing speed used to input the first user credential into the first user device and whether the typing speed used to input the first user credential matches a typing speed of an authorized user of the technology resource; or
    determining a similarity of the first user credential to a previous stored valid user credential used for the technology resource.

16. The computer-implemented method of claim 11, further comprising:
    after enforcing the credential lockout for the technology resource, receiving a new potential valid credential;
    evaluating whether the new potential valid credential satisfies a plurality of generic credential complexity rules for setting a new stored valid credential;
    evaluating whether the new potential valid credential satisfies a plurality of user-specific credential complexity rules for setting a new stored valid credential; and
    in response to determining that the new potential valid credential satisfies the plurality of generic credential complexity rules and the plurality of user-specific credential complexity rules, resetting the new potential valid credential as the new stored valid credential for the technology resource.

17. The computer-implemented method of claim 16, further comprising:
    receiving proof of an identity of an individual submitting the new potential valid credential; and
    verifying that the proof supports a conclusion that the individual is an authorized user associated of the technology resource;
    wherein setting the new potential valid credential as the stored valid credential further comprises setting the new potential valid credential as the stored valid credential for the technology resource further in response to verifying that the proof supports the conclusion that the individual is the authorized user.

18. The computer-implemented method of claim 16, wherein the plurality of generic credential complexity rules comprises at least one of:
    requiring the new stored valid credential to comprise a certain number of character types;
    requiring the new stored valid credential to be of at least a certain length;
    requiring the new stored valid credential to be different from a previous stored valid credential for the technology resource; or
    requiring the new stored valid credential to not include a commonly used credential.

19. The computer-implemented method of claim 16, wherein the plurality of user-specific credential complexity rules are based on an analysis of a plurality of previous user credentials, the analysis identifying one or more patterns in the plurality of previous user credentials, wherein each previous user credential is associated with an unsuccessful log-on attempt to access the technology resource.

20. A computer program product for identifying potential misappropriation attempts into a technology resource and enforcing a credential lockout with at least one non-transitory computer-readable medium having computer-readable program code portions embodied therein, the computer-readable program code portions comprising:
    an executable portion configured for receiving a first user credential from a first user device, wherein the first user credential is associated with a first log-on attempt to access a technology resource;
    an executable portion configured for determining whether the first user credential matches a stored valid credential for the technology resource;
    an executable portion configured for performing a misappropriation assessment in response to determining that the first user credential does not match the stored valid credential, wherein the misappropriation assessment comprises:

evaluating a plurality of potential misappropriation factors for the first log-on attempt;

weighting the plurality of potential misappropriation factors;

determining a misappropriation score from the weighted plurality of potential misappropriation factors; and adding the misappropriation score to a cumulative misappropriation score for the technology resource, wherein the cumulative misappropriation score comprises at least one previous misappropriation score associated with a previous user credential and a previous log-on attempt;

an executable portion configured for determining whether the cumulative misappropriation score has reached or exceeded a threshold; and an executable portion configured for enforcing a credential lockout for the technology resource in response to the cumulative misappropriation score reaching or exceeding the threshold.

* * * * *